United States Patent
Nakano et al.

(10) Patent No.: US 8,395,732 B2
(45) Date of Patent: Mar. 12, 2013

(54) LIQUID CRYSTAL PANEL AND LIQUID CRYSTAL DISPLAY APPARATUS

(75) Inventors: Shuusaku Nakano, Osaka (JP); Takeharu Kitagawa, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 1093 days.

(21) Appl. No.: 12/089,672

(22) PCT Filed: Nov. 16, 2006

(86) PCT No.: PCT/JP2006/322834
§ 371 (c)(1),
(2), (4) Date: Apr. 9, 2008

(87) PCT Pub. No.: WO2005/060875
PCT Pub. Date: May 31, 2007

(65) Prior Publication Data
US 2009/0231528 A1    Sep. 17, 2009

(30) Foreign Application Priority Data
Nov. 28, 2005   (JP) .................................. 2005-342426

(51) Int. Cl.
*G02F 1/1335* (2006.01)
(52) U.S. Cl. ......... 349/120; 349/117; 349/118; 349/119
(58) Field of Classification Search ........... 349/117–120
See application file for complete search history.

(56) References Cited

U.S. PATENT DOCUMENTS

| | | | |
|---|---|---|---|
| 6,339,460 B1 | 1/2002 | Saitoh | |
| 2002/0191129 A1* | 12/2002 | Van De Witte et al. | 349/96 |
| 2003/0169391 A1 | 9/2003 | Uchida et al. | |
| 2003/0193635 A1* | 10/2003 | Mi et al. | 349/117 |
| 2005/0110933 A1* | 5/2005 | Jeon et al. | 349/141 |
| 2005/0190326 A1* | 9/2005 | Jeon et al. | 349/117 |
| 2005/0206817 A1* | 9/2005 | Kajita et al. | 349/119 |
| 2006/0066787 A1 | 3/2006 | Yoda et al. | |

FOREIGN PATENT DOCUMENTS

| | | |
|---|---|---|
| JP | 2000-039610 A | 2/2000 |
| JP | 2002-116463 A | 4/2002 |
| JP | 2003-262869 A | 9/2003 |
| JP | 2006-126777 B2 | 5/2006 |

OTHER PUBLICATIONS

International Search Report of PCT/JP2006/322834 date of mailing Feb. 20, 2007.

* cited by examiner

*Primary Examiner* — Nathanael R Briggs
(74) *Attorney, Agent, or Firm* — Westerman, Hattori, Daniels & Adrian, LLP

(57) ABSTRACT

A liquid crystal panel according to an embodiment of the present invention includes: a liquid crystal cell; a first polarizer placed on one side of the liquid crystal cell; a second polarizer placed on another side of the liquid crystal cell; a biaxial optical element placed between the liquid crystal cell and the first polarizer; and a negative C plate placed between the second polarizer and the biaxial optical element. A direction of an absorption axis of the first polarizer is substantially perpendicular to a direction of an absorption axis of the second polarizer. A refractive index ellipsoid of the biaxial optical element has a relationship of nx>nz>ny and a direction of a slow axis of the biaxial optical element is substantially parallel to the direction of the absorption axis of the first polarizer. A refractive index ellipsoid of the negative C plate has a relationship of nx=ny>nz. A wavelength dispersion value ($D_1$) of the biaxial optical element and a wavelength dispersion value ($D_2$) of the negative C plate satisfy a relationship of $D_1 \geq D_2$.

19 Claims, 7 Drawing Sheets

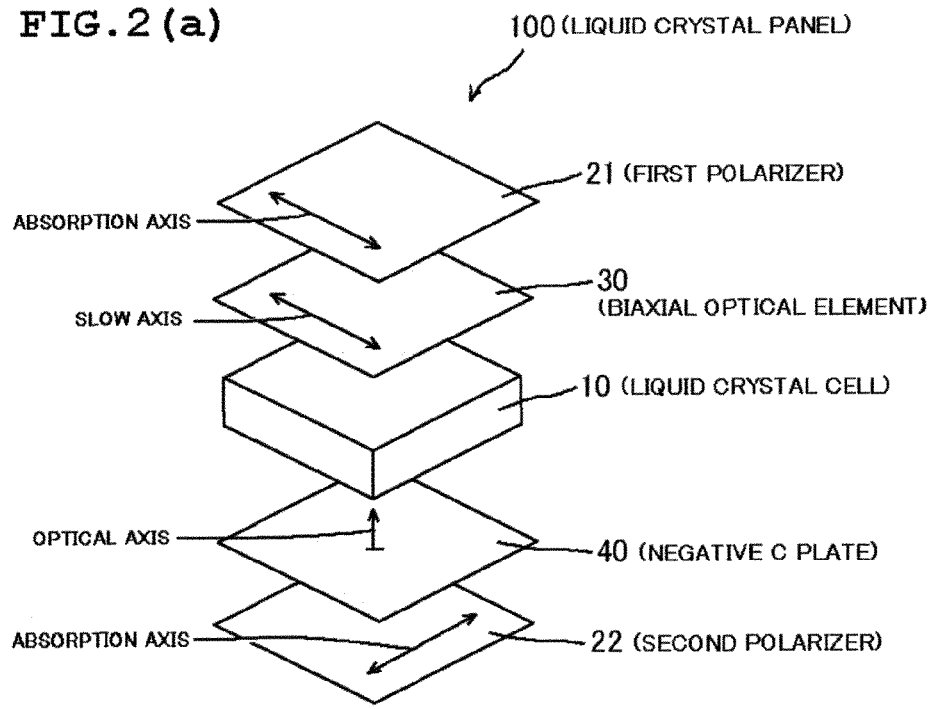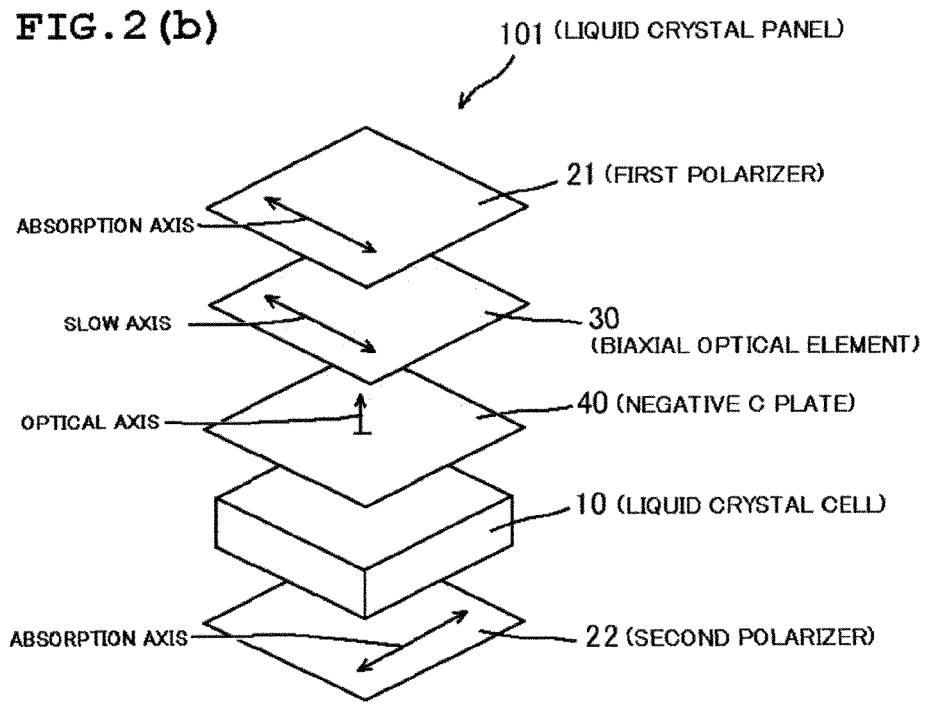

REFRACTIVE INDEX
ELLIPSOID OF LIQUID
CRYSTAL CELL $nz > nx = ny$

REFRACTIVE INDEX
ELLIPSOID OF NEGATIVE
C PLATE $nx = ny > nz$

REFRACTIVE INDEX
ELLIPSOID OF LAMINATE
HAVING OPTICAL ISOTROPY $nx = ny = nz$

LIQUID CRYSTAL PANEL AND LIQUID CRYSTAL DISPLAY APPARATUS

TECHNICAL FIELD

The present invention relates to a liquid crystal panel including a liquid crystal cell, a polarizer, and an optical element. The present invention also relates to a liquid crystal display apparatus using the liquid crystal panel.

BACKGROUND ART

A liquid crystal display apparatus is attracted attention for its properties such as being thin, lightweight, and having low power consumption, and is widely used in portable devices such as a cellular phone and a watch, office automation (OA) devices such as a personal computer monitor and a laptop personal computer, and home electrical appliances such as a video camera and a liquid crystal television. This owes to technical innovations of the liquid crystal display apparatus overcoming such disadvantages that its display characteristics vary depending on a viewing angle of a screen and cannot be operated at high temperatures and very low temperatures. However, as the range of its use has been increased, required characteristics vary depending on its use. For example, in a conventional liquid crystal display apparatus, it has been said that the display characteristic may only satisfy a contrast ratio between white/black displays of about 10 in an oblique direction. This definition derives from a contrast ratio of black ink printed on white paper such as newspapers and magazines. However, in a case where the liquid crystal display apparatus is used in a floor type television, several persons view the screen of the television at the same time. Accordingly, demand is growing for a display in which a reduction in contrast ratio between a front direction and an oblique direction can be further suppressed. Further, as the display becomes larger, a person viewing the screen views the four corners of the screen in different azimuths even if he or she does not move. Accordingly, it is also important for the contrast ratio of the liquid crystal apparatus not to change depending on the azimuth in which he or she views the screen. Unless such problems are alleviated, a human being who views the screen of a large color television will feel senses of incongruity and fatigue.

Various retardation films have been conventionally used in a liquid crystal display apparatus. For example, a method involving placing a retardation film the refractive index ellipsoid of which has the relationship of nx>nz>ny and a retardation film the refractive index ellipsoid of which has the relationship of nx=ny>nz on one side of a liquid crystal cell according to a vertical alignment (VA) mode to improve a contrast ratio in an oblique direction has been disclosed (see, for example, Patent Document 1). However, a liquid crystal display apparatus obtained by such technology involves the following problem: when one views the screen of the apparatus in an oblique direction, a contrast ratio largely changes depending on the azimuth in which he or she views the screen, or the contrast ratio remarkably reduces in a specific azimuth. Accordingly, the solution of such problem has been desired.

Patent Document 1: JP 2000-039610 A

DISCLOSURE OF THE INVENTION

Problem to be Solved by the Invention

The present invention has been made in view of solving the above problem, and an object of the present invention is therefore to provide a liquid crystal display apparatus capable of maintaining a contrast ratio at a higher level in both of a front direction and an oblique direction. Furthermore, an object of the present invention is to provide a liquid crystal display apparatus having a constant contrast ratio at any azimuth angles of 0° to 360° when viewing from an oblique direction.

Means for Solving the Problem

The present inventors have conducted intensive studies for solving the above problems, and have found that the above objects can be attained with the liquid crystal panel described below, to thereby complete the present invention.

A liquid crystal panel according to an embodiment of the present invention includes: a liquid crystal cell; a first polarizer placed on one side of the liquid crystal cell; a second polarizer placed on another side of the liquid crystal cell; a biaxial optical element placed between the liquid crystal cell and the first polarizer; and a negative C plate placed between the second polarizer and the biaxial optical element. A direction of an absorption axis of the first polarizer is substantially perpendicular to a direction of an absorption axis of the second polarizer. A refractive index ellipsoid of the biaxial optical element has a relationship of nx>nz>ny and a direction of a slow axis of the biaxial optical element is substantially parallel to the direction of the absorption axis of the first polarizer. A refractive index ellipsoid of the negative C plate has a relationship of nx=ny>nz. A wavelength dispersion value ($D_1$) of the biaxial optical element and a wavelength dispersion value ($D_2$) of the negative C plate satisfy a relationship of $D_1 \geq D_2$.

In one embodiment of the invention, a difference ($D_1-D_2$) between the wavelength dispersion value ($D_1$) of the biaxial optical element and the wavelength dispersion value ($D_2$) of the negative C plate is 0 to 0.2.

In another embodiment of the invention, the wavelength dispersion value ($D_1$) of the biaxial optical element, the wavelength dispersion value ($D_2$) of the negative C plate, and a wavelength dispersion value ($D_{LC}$) of the liquid crystal cell satisfy a relationship of $D_{LC}>D_1 \geq D_2$ or of $D_1 \geq D_{LC}>D_2$.

In still another embodiment of the invention, the negative C plate is placed between the liquid crystal cell and the second polarizer.

In still another embodiment of the invention, the negative C plate is placed between the liquid crystal cell and the biaxial optical element.

Instill another embodiment of the invention, the liquid crystal cell includes a liquid crystal layer containing liquid crystal molecules aligned in a homeotropic alignment in the absence of an electric field.

Instill another embodiment of the invention, $Rth[590]_{LC}$ of the liquid crystal cell in the absence of an electric field is 200 nm to 500 nm.

In still another embodiment of the invention, Re[590] of the biaxial optical element is 100 nm to 300 nm.

In still another embodiment of the invention, the wavelength dispersion value ($D_1$) of the biaxial optical element is 0.90 to 1.10.

In still another embodiment of the invention, an Nz coefficient of the biaxial optical element is 0.1 to 0.7.

In still another embodiment of the invention, the biaxial optical element includes a retardation film containing a norbornene-based resin.

In still another embodiment of the invention, an absolute value for a sum of $Rth[590]_2$ of the negative C plate and Rth[590]$_{LC}$ of the liquid crystal cell in the absence of an electric field (|Rth[590]$_2$+Rth[590]$_{LC}$|) is 50 nm or less.

Instill another embodiment of the invention, Rth[590]$_2$ of the negative C plate is 150 nm to 550 nm.

In still another embodiment of the invention, the wavelength dispersion value (D$_2$) of the negative C plate is 0.70 to 1.10.

In still another embodiment of the invention, the negative C plate includes a retardation film containing a cellulose-based resin.

According to another aspect of the present invention, a liquid crystal display apparatus is provided. The liquid crystal display apparatus includes the liquid crystal panel as described above. In one embodiment of the invention, an average of contrast ratios at an azimuth angle of 45° and polar angles of 0° to 80° is 160 or more. In another embodiment of the invention, an average of contrast ratios at a polar angle of 40° and azimuth angles of 0° to 360° is 120 or more. In still another embodiment of the invention, a difference between a maximum value and a minimum value for contrast ratios at a polar angle of 40° and azimuth angles of 0° to 360° is 100 or less.

According to another aspect of the present invention, a television is provided. The television employs the liquid crystal display apparatus as described above.

Effects of the Invention

In a liquid crystal panel according to an embodiment of the present invention, two optical elements satisfying a specific wavelength dispersion relationship are arranged with a specific positional relationship. A liquid crystal display apparatus including such a liquid crystal panel maintains a contrast ratio at a higher level in both of a front direction and an oblique direction compared with a conventional liquid crystal display apparatus, and has a constant contrast ratio at any azimuth angles of 0° to 360° when viewing from an oblique, direction.

BRIEF DESCRIPTION OF THE DRAWINGS

FIGS. 2(a) and 2(b) Schematic perspective view of a liquid crystal panel of FIGS. 1(a) and 1(b), respectively.

DESCRIPTION OF REFERENCE NUMERALS

Figure 1A:
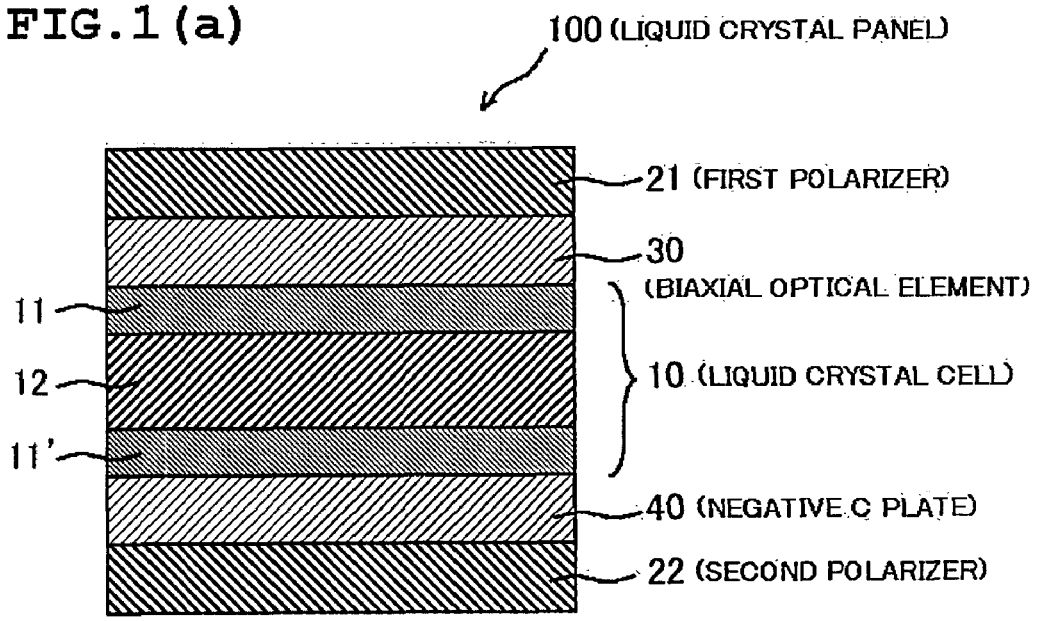
FIGS. 1(a) and 1(b) Schematic cross-sectional view of a liquid crystal panel according to a preferred embodiment of the present invention, respectively.

| | |
|---|---|
| 10 | Liquid crystal cell |
| 11,11' | Substrate |
| 12 | Liquid crystal layer |
| 21 | First polarizer |
| 22 | Second polarizer |
| 30 | Biaxial optical element |
| 40 | Negative C plate |
| 60,60' | Protective layer |
| 70,70' | Surface treatment layer |
| 80 | Backlight unit |
| 81 | Light source |
| 82 | Reflective film |
| 83 | Diffusion plate |
| 84 | Prism sheet |
| 85 | Brightness enhancing film |
| 100 | Liquid crystal panel |
| 200 | Liquid crystal display apparatus |
| 300 | Feed part |
| 310 | Bath of aqueous iodine solution |
| 320 | Bath of aqueous solution containing iodine and potassium iodide |
| 330 | Bath of aqueous solution containing potassium iodide |
| 340 | Drying means |
| 350 | Polarizer |
| 360 | Take-up part |
| 401,403,405 | Feed part |
| 414,416,419 | Take-up part |
| 404,406 | Shrinkable film |
| 407,408 | Laminate roll |
| 409 | Heating means |

BEST MODE FOR CARRYING OUT THE INVENTION

Definition of Terms and Symbols (1) "nx", "ny" and "nz" respectively represent refractive indices in a slow axis direction, in a fast axis direction and in a thickness direction. The slow axis direction refers to a direction in which an in-plane refractive index becomes maximum, and the fast axis direction refers to a direction perpendicular to the slow axis in the same plane.

(2) Re[λ] refers to an in-plane retardation value using light having a wavelength of λ(nm) at 23° C. For example, Re[590] refers to an in-plane retardation value using light having a wavelength of 590 (nm) at 23° C. In the case where an optical element is a single retardation film, the phrase "in-plane retardation value" means an in-plane retardation value of the film. In the case where an optical element is a laminate including a retardation film, the phrase "in-plane retardation value" means an in-plane retardation value of the laminate. Re[λ] is obtained by Re[λ]=(nx−ny)×d.

(3) Rth[λ] refers to a thickness direction retardation value using light having a wavelength of λ(nm) at 23° C. For example, Rth[590] refers to a thickness direction retardation value using light having a wavelength of 590 (nm) at 23° C. In the case where an optical element is a single retardation film, the phrase "thickness direction retardation value" means a thickness direction retardation value of the film. In the case where an optical element is a laminate including a retardation film, the phrase "thickness direction retardation value" means a thickness direction retardation value of the laminate. $Rth[\lambda]$ is obtained by $Rth[\lambda]=(nx-nz)\times d$.

(4) An Nz coefficient is obtained by $Nz=Rth[\lambda]/Re[\lambda]$. Unless specifically indicated, $\lambda=590$ nm.

(5) A wavelength dispersion value ($D_1$) is obtained by the expression; $Re[480]/Re[590]$.

(6) Wavelength dispersion values ($D_2$) and ($D_{LC}$) are obtained by the expression; $R40[480]/R40[590]$. $R40[480]$ and $R40[590]$ are each a retardation value measured by inclining the element by 40° with respect to a normal line direction thereof and by using light having wavelength of 480 nm and 590 nm at 23° C.

(7) The subscript "1" attached to a term or symbol represents a biaxial optical element; the subscript "2" represents a negative C plate; and the subscript "LC" represents a liquid crystal cell.

A. Outline of Entirety of Liquid Crystal Panel

Figure 1B:
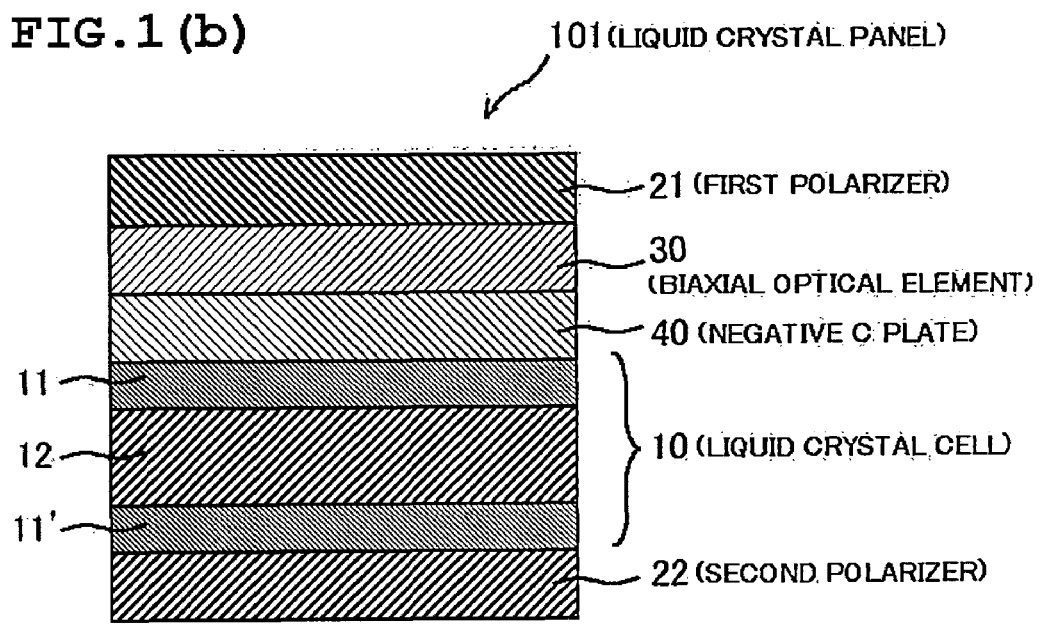

FIGS. 1(a) and 1(b) are each a schematic cross-sectional view of a liquid crystal panel according to a preferred embodiment of the present invention. FIG. 2(a) is a schematic perspective view of the liquid crystal panel shown in FIG. 1(a). FIG. 2(b) is a schematic perspective view of the liquid crystal panel shown in FIG. 1(b). It should be noted that a ratio among the width, length, and thickness of each constituting member in each of FIGS. 1(a), 1(b), 2(a) and 2(b) is different from an actual ratio in order that one may be able to view the figures easily. FIGS. 1(a) and 2(a) each show a state where a negative C plate is placed between a liquid crystal cell and a second polarizer, and FIGS. 1(b) and 2(b) each show a state where the negative C plate is placed between the liquid crystal cell and a biaxial optical element.

A liquid crystal panel 100 shown in FIG. 1(a) and a liquid crystal panel 101 shown in FIG. 1(b) each include: a liquid crystal cell 10; a first polarizer 21 placed on one side of the liquid crystal cell 10; a second polarizer 22 placed on another side of the liquid crystal cell 10; a biaxial optical element 30 placed between the liquid crystal cell 10 and the first polarizer 21; and a negative C plate 40 placed between the second polarizer 22 and the biaxial optical element 30. In the liquid crystal panel 100 shown in FIG. 1(a), the negative C plate 40 is placed between the liquid crystal cell 10 and the second polarizer 22. In the liquid crystal panel 101 shown in FIG. 1(b), the negative C plate 40 is placed between the liquid crystal cell 10 and the biaxial optical element 30. The direction of the absorption axis of the first polarizer 21 is substantially perpendicular to the direction of the absorption axis of the second polarizer 22. The refractive index ellipsoid of the biaxial optical element 30 has the relationship of nx>nz>ny. Further, the direction of the slow axis of the biaxial optical element 30 is substantially parallel to the direction of the absorption axis of the first polarizer 21. The refractive index ellipsoid of the negative C plate 40 has the relationship of nx=ny>nz. A wavelength dispersion value ($D_1$) of the biaxial optical element 30 and a wavelength dispersion value ($D_2$) of the negative C plate 40 satisfy the relationship of $D_1 \geq D_2$. A liquid crystal display apparatus including such liquid crystal panel has the following excellent effects: a contrast ratio between a front direction and an oblique direction is maintained at a higher level than that of a conventional liquid crystal display apparatus, and, in the case where one views the screen of the apparatus in an oblique direction, the contrast ratio is constant even when he or she views the screen in any azimuth of 0° to 360°.

A difference ($D_1-D_2$) between the wavelength dispersion value ($D_1$) of the above biaxial optical element and the wavelength dispersion value ($D_2$) of the above negative C plate is preferably 0 to 0.2, more preferably 0.03 to 0.2, particularly preferably 0.06 to 0.18, and most preferably 0.08 to 0.15. Setting the difference between $D_1$ and $D_2$ within the above range optimizes the optical compensation of the liquid crystal display apparatus so that the wavelength dependence of the optical compensation is extremely small. As a result, a liquid crystal display apparatus having the following characteristics can be obtained: a contrast ratio between a front direction and an oblique direction is maintained at a much higher level than that of a conventional liquid crystal display apparatus, and, in the case where one views the screen of the apparatus in an oblique direction, the contrast ratio is constant even when he or she views the screen in any azimuth of 0° to 360°.

The wavelength dispersion value ($D_1$) of the above biaxial optical element, the wavelength dispersion value ($D_2$) of the above negative C plate, and a wavelength dispersion value ($D_{LC}$) of the above liquid crystal cell preferably satisfy the relationship of $D_{LC}>D_1 \geq D_2$ or of $D_1 \geq D_{LC}>D_2$. Setting $D_1$, $D_2$, and $D_{LC}$ to satisfy the above relationship can provide a liquid crystal display apparatus having additionally excellent display characteristic.

FIG. 2(a) shows one embodiment of the above liquid crystal panel. In the embodiment, the biaxial optical element 30 is placed between the liquid crystal cell 10 and the first polarizer 21, and the negative C plate 40 is placed between the liquid crystal cell 10 and the second polarizer 22. According to such embodiment, a liquid crystal panel having the following characteristics can be obtained: the thicknesses of optical members to be placed on both sides of a liquid crystal cell can be easily uniform, and the curling of each member hardly occurs even under, for example, an environment where temperature largely changes. The figure shows an example of a liquid crystal panel when a biaxial optical element is placed above a liquid crystal cell, however, the present invention may be applicable to the upside-down configuration.

FIG. 2(b) shows another embodiment of the above liquid crystal panel. In the embodiment, the biaxial optical element 30 is placed between the liquid crystal cell 10 and the first polarizer 21, and the negative C plate 40 is placed between the liquid crystal cell 10 and the biaxial optical element 30. The figure shows an example of a liquid crystal panel when a biaxial optical element is placed above a liquid crystal cell, however, the present invention may be applicable to the upside-down configuration.

It should be noted that the liquid crystal panel of the present invention is not limited to the above embodiment. For example, any other constituting member may be placed between two arbitrary adjacent constituting members shown in each of FIGS. 1(a) and 1(b). Hereinafter, details about the respective members and the respective layers constituting the liquid crystal panel of the present invention will be described.

B. Liquid Crystal Cell

Referring to FIGS. 1(a) and 1(b), the liquid crystal cell 10 used in the present invention includes a pair of substrates 11, 11' and a liquid crystal layer 12 as a display medium placed between the substrates 11, 11'. On one substrate (active matrix substrate) 11', switching elements (typically, TFTs) for controlling the electrooptical characteristics of liquid crystal, and scanning lines that provide a gate signal to the switching elements and signal lines that provide a source signal to the switching elements are provided (either not shown). On the other substrate (color filter substrate) 11, a color filter is provided. The color filter may be provided on the active matrix substrate 11'. Alternatively, in the case where an RGB 3-color light source is used for a backlight unit of a liquid crystal display apparatus as in a field sequential system, the above-mentioned color filter can be omitted. The interval (cell gap) between two substrates 11, 11' is controlled with spacers (not shown). On a side of each of the substrates 11, 11', which is in contact with a liquid crystal layer 12, an alignment film made of, for example, polyimide is provided (not shown). Alternatively, for example, in the case where the initial alignment of liquid crystal molecules is controlled using a fringe electric field formed by a patterned transparent electrode, the alignment film can be omitted.

The liquid crystal cell 10 preferably contains liquid crystal molecules aligned in a homeotropic alignment. In such a liquid crystal layer (eventually, a liquid crystal cell), a refractive index ellipsoid typically has a relationship of nz>nx=ny. In the present specification, the phrase "nx=ny" includes not only the case where nx and ny are strictly equal but also the case where nx and ny are substantially equal.

The above liquid crystal cell 10 is preferably driven according to a vertical alignment (VA) mode or a deformation of vertical aligned phase type electrically controlled birefringence (ECB) mode (also referred to as "DAP type ECB mode"). Those modes are representative examples of a driving mode using a liquid crystal layer the refractive index ellipsoid of which has the relationship of nz>nx=ny.

The VA mode allows liquid crystal molecules aligned in a homeotropic molecule alignment under no electric field application in transparent electrodes to respond with an electric field in a direction normal to a substrate, using a voltage control birefringence effect (ECB: Electrically Controlled Birefringence). More specifically, for example, as described in JP 62-210423 A and JP 04-153621 A, in the case of abnormally black mode, liquid crystal molecules are aligned in a direction normal to a substrate under no electric field application, so a black display is obtained when upper and lower polarizing plates are placed so as to be perpendicular to each other. On the other hand, under electric field application, liquid crystal molecules are operated so as to be tilted at an azimuth of 45° with respect to an absorption axis of a polarizing plate, whereby a transmittance increases to obtain a white display. In addition, the liquid crystal cell of a VA mode may be set to be a multi-domain by using an electrode with a slit or a base material with protrusions formed on its surface, as described in JP 11-258605 A, for example. Examples of such a liquid crystal cell include an Advanced Super View (ASV) mode manufactured by Sharp Corporation, a Continuous Pinwheel Alignment (CPA) mode manufactured by Sharp Corporation, a Multi-domain Vertical Alignment (MVA) manufactured by Fujitsu Ltd., a Patterned Vertical Alignment (PVA) mode manufactured by Samsung Electronics Co., Ltd., an Enhanced Vertical Alignment (EVA) mode manufactured by Samsung Electronics Co., Ltd., and Super Ranged Viewing by Vertical Alignment (SURVIVAL) mode manufactured by Sanyo Electric Co., Ltd.

The phrase "liquid crystal molecules aligned in a homeotropic alignment" refers to the following state: as a result of an interaction between a substrate subjected to an alignment treatment and each of the liquid crystal molecules, the alignment vectors of the liquid crystal molecules are evenly aligned perpendicular (in a direction normal) to a substrate plane. It should be noted that, in the present specification, the case where each of the above alignment vectors is slightly inclined relative to the normal direction of the substrate, that is, the case where the liquid crystal molecules each have a pretilt is also included in the homeotropic alignment. When the liquid crystal molecules each have a pretilt, the pretilt angle of each of the molecules (angle relative to the normal of the substrate) is preferably 5° or less, or more preferably 3° or less. Setting the pretilt angle within the above range can provide a liquid crystal display apparatus having a high contrast ratio.

Any appropriate molecule can be adopted as each of the above liquid crystal molecules depending on purposes. Each of the above liquid crystal molecules is preferably a nematic liquid crystal having a negative dielectric anisotropy. The nematic liquid crystal having a negative dielectric anisotropy is, for example, a liquid crystal shown in "Color Liquid Crystal Display" edited by KYORITSU SHUPPAN CO., LTD, p. 196, FIG. 6.2.10. The birefringence of the above nematic liquid crystal at 23° C. measured with light having a wavelength of 589 nm is preferably 0.05 to 0.15. It should be noted that the above birefringence can be determined from a difference (ne−no) between an extraordinary refractive index (ne) and an ordinary refractive index (no) measured by evenly and uniformly aligning the liquid crystal molecules.

Any appropriate cell gap (interval between substrates) can be adopted as the cell gap of the above liquid crystal cell depending on purposes. The cell gap is preferably 1.0 μm to 7.0 μm. Setting the cell gap of the liquid crystal cell within the above range can provide a liquid crystal display apparatus having a short response time.

$Rth[590]_{LC}$ under no electric field application of the liquid crystal cell is preferably −200 nm to −500 nm, more preferably −210 nm to −450 nm, and particularly preferably −220 nm to −400 nm. $Rth[590]_{LC}$ may be appropriately adjusted based on the birefringence of liquid crystal molecules and a cell gap.

A wavelength dispersion value ($D_{LC}$) of the above liquid crystal cell can be set to an appropriate value depending on purposes. The wavelength dispersion value ($D_{LC}$) of the liquid crystal cell and the wavelength dispersion value ($D_2$) of the negative C plate preferably satisfy the relationship of $D_{LC}>D_2$. Further, the above wavelength dispersion value ($D_{LC}$) is preferably more than 1 and 1.3 or less, more preferably more than 1 and 1.2 or less, and particularly preferably more than 1 and 1.1 or less. Setting $D_{LC}$ within the above range can provide a liquid crystal display apparatus having additionally excellent display characteristic.

Any appropriate method can be adopted as a method of adjusting the wavelength dispersion value ($D_{LC}$) of the above liquid crystal cell. As shown in, for example, "Color Liquid Crystal Display" edited by KYORITSU SHUPPAN CO., LTD, p. 195, FIG. 6.2.9., the wavelength dependence of the refractive index of a fluorine-based liquid crystal molecule is generally smaller than that of a cyano-based liquid crystal molecule. The $D_{LC}$ value of the above liquid crystal cell can be set to an appropriate value depending on the kinds of substituents for the liquid crystal molecules and a mixing ratio between two or more kinds of liquid crystal molecules having different wavelength dependence from each other.

As the liquid crystal cell, the one mounted on a commercially available liquid crystal display apparatus may be used as it is. Examples of the commercially available liquid crystal display apparatuses employing a VA mode include a 37V-type liquid crystal television "AQUOS LC-37AD5" (trade name) manufactured by Sharp Corporation, a 32V-type wide liquid crystal television "LN32R51B" (trade name) manufactured by SUMSUNG, a liquid crystal television "FORIS SC26XD1" (trade name) manufactured by NANAO Corporation, and a liquid crystal television "T460HW01" (trade name) manufactured by AU Optronics.

C. Polarizer

In the present specification, the term "polarizer" refers to an element capable of converting natural light or polarized light into any polarized light. Any appropriate polarizer can be adopted as the polarizer used in the present invention. The polarizer used in the present invention preferably converts natural light or polarized light into linearly polarized light.

When incident light is split into two perpendicular polarization components, such a polarizer has a function of transmitting one of the polarization components and has at least one function selected from the functions of absorbing, reflecting, and scattering the other polarization component. In a liquid crystal panel according to the present invention, the first polarizer and the second polarizer may be identical to or different from each other.

Referring to FIGS. 1(a) and 1(b), the first polarizer 21 is placed on one side of the liquid crystal cell 10, and the second polarizer 22 is placed on another side of the liquid crystal cell 10. A direction of an absorption axis of the first polarizer 21 is substantially perpendicular to a direction of an absorption axis of the second polarizer 22. In the present specification, the phrase "substantially perpendicular" includes the case where an angle formed by two optical axes (here, an angle formed by the direction of the absorption axis of the first polarizer 21 and that of the second polarizer 22) is 90°±2.0°, preferably 90°±1.0°, and more preferably 90°±0.5°.

As an thickness of the polarizer, any appropriate thickness can be selected in accordance with purposes. The thickness of the polarizer is preferably 5 μm to 50 μm, and more preferably 10 μm to 30 μm.

In one embodiment, the polarizer is preferably provided with a protective layer on one side or both sides of the polarizer. Such an element is also referred to as a polarizing plate. As a material for forming the protective layer, any appropriate material may be adopted. The protective layer preferably has substantially optical isotropy. As the protective layer, a polymer film containing a cellulose-based resin or a norbornene-based resin and having a thickness of 10 μm to 100 μm may be used. Such a resin has excellent transparency, mechanical strength and chemical resistance, and exhibits low birefringence.

As the polarizers used in the present invention, a commercially available polarizing plate can be used as it is. Examples of the commercially available polarizing plate include "NPF" series (for example, SIG1423DU (trade name)) manufactured by Nitto Denko Corporation. Such a polarizing plate has protective layers on both sides of a polarizer, and each of the protective layers has substantially optical isotropy. Furthermore, such a polarizing plate has excellent optical properties, optical uniformity and durability.

C-1. Optical Properties of Polarizer

A light transmittance (also referred to as a single axis transmittance) of the polarizer, which is measured using light having wavelength of 550 nm at 23° C., is preferably 40% or more, and more preferably 42% or more. The theoretical upper limit of the single axis transmittance is 50% and the practical upper limit thereof is 46%.

A degree of polarization of the polarizer, which is measured using light having wavelength of 550 nm at 23° C., is preferably 99.8% or more, and more preferably 99.9% or more. The theoretical upper limit of the degree of polarization is 100%. By setting the degree of polarization in the above range, a liquid crystal display apparatus having a higher contrast ratio in a front direction can be obtained.

A hue under the National Bureau of Standards (NBS) of the polarizer; a-value (simplex a-value) is preferably −2.0 or more, and more preferably −1.8 or more. The ideal a-value is 0. The hue under the National Bureau of Standards (NBS) of the polarizer; b-value (simplex b-value) is preferably 4.2 or less, and more preferably 4.0 or less. The ideal b-value is 0. By setting the a-value and the b-value of the polarizer close to 0, a liquid crystal display apparatus providing a display image with vivid color can be obtained.

The single axis transmittance, the degree of polarization and the hue can be measured by using a spectrophotometer "DOT-3" (trade name) manufactured by Murakami Color Research Laboratory. Specifically, the degree of polarization can be determined by: measuring a parallel light transmittance ($H_0$) and a perpendicular light transmittance ($H_{90}$) of the polarizer; and using the following equation: degree of polarization (%)=$\{(H_0-H_{90})/(H_0+H_{90})\}^{1/2} \times 100$. The parallel light transmittance ($H_0$) refers to a value of light transmittance of a parallel laminate polarizer manufactured by piling two identical polarizers such that their absorption axes are parallel to each other. The perpendicular light transmittance ($H_{90}$) refers to a value of light transmittance of a perpendicular laminate polarizer manufactured by piling two identical polarizers such that their absorption axes are perpendicular to each other. These light transmittances refer to a Y value obtained through visibility correction by a two-degree field of view (C light source) in accordance with JIS Z 8701-1982.

C-2. Method of Placing Polarizer

Referring to FIGS. 1(a) and 1(b), as a method of placing the first polarizer 21 and the second polarizer 22, any appropriate method can be adopted in accordance with purposes. Specifically, the first polarizer 21 is preferably attached to a surface of the biaxial optical element 30 through an adhesion layer (not shown) provided on a side of the first polarizer that faces the liquid crystal cell 10. The second polarizer 22 is preferably attached to a surface of the negative C plate 40 or the liquid crystal cell 10 through an adhesion layer (not shown) provided on a side of the second polarizer that faces the liquid crystal cell 10. In the case where any optical element is provided between the liquid crystal cell 10 and the second polarizer 22, the second polarizer 22 is attached to a surface of the optical element.

In the present specification, the term "adhesion layer" refers to a layer that connects surfaces of adjacent optical members and integrates them with a practically sufficient adhesive strength and for practically sufficient amount of adhesion time. Examples of the adhesion layer include an adhesive layer, a pressure-sensitive adhesive layer, and an anchor coat layer.

The above adhesion layer may have a multi-layered configuration in which an anchor coat agent is formed on the surface of an adherend, and an adhesion layer or a pressure-sensitive adhesion layer is formed thereon. The above adhesion layer may also be a thin layer (also referred to as a hair line) that cannot be recognized with naked eyes. The polarizer is attached in the above described manner, thereby being capable of preventing shift in an absorption axis of the polarizer, and of preventing damages on the polarizer or the adjacent optical element due to abrasion thereof upon incorporating into the liquid crystal display apparatus. Further, adverse effects of reflection or refraction that generates on the interface between the polarizer and the adjacent optical elements can be reduced, to thereby provide a liquid crystal display apparatus capable of displaying vivid image.

A thickness of the adhesion layer can be appropriately selected in accordance with purposes. The thickness of the polarizer is preferably 0.01 μm to 50 μm. A thickness of the adhesion layer within the above ranges prevents floating or peeling of the polarizer to be attached and may provide adhesive strength and adhesive time causing no adverse effects in practical use.

An appropriate material can be selected as a material for forming the above adhesion layer depending on the kind of an adherend and purposes. The material for forming the above adhesion layer is preferably a water-soluble adhesive containing a polyvinyl alcohol-based resin as a main component.

This is because the adhesive has excellent adhesiveness with a polarizer, and has excellent workability, productivity, and economical efficiency. A commercially available adhesive can be used as it is as the above water-soluble adhesive containing a polyvinyl alcohol-based resin as a main component. Alternatively, a commercially available adhesive can be mixed with a solvent or an additive before use. Examples of the commercially available water-soluble adhesive containing a polyvinyl alcohol-based resin as a main component include: Gohsenol series manufactured by Nippon Synthetic Chemical Industry Co., Ltd (tradenames "NH-18S, GH-18S, T-330, and the like"); and Gohsefimer series manufactured by Nippon Synthetic Chemical Industry Co., Ltd (tradenames "Z-100, Z-200, Z-210, and the like").

The above adhesion layer may be obtained by cross-linking a composition obtained by further blending the above water-soluble adhesive with a cross-linking agent. An appropriate agent can be adopted as the above cross-linking agent depending on purposes. Examples of the above cross-linking agent include an amine compound, an aldehyde compound, a methylol compound, an epoxy compound, an isocyanate compound, and a polyvalent metal salt. A commercially available cross-linking agent can be used as it is as the above cross-linking agent. Examples of the commercially available cross-linking agent include: an amine compound marketed under the trade name of "m-xylenediamine" by MITSUBISHI GAS CHEMICAL COMPANY, INC.; an aldehyde compound marketed under the trade name of "glyoxal" by Nippon Synthetic Chemical Industry Co., Ltd; and a methylol compound marketed under the trade name of "WATERSOL" by DAINIPPON INK AND CHEMICALS, INCORPORATED.

C-3. Optical Film Used for Polarizer

As an optical film used for the polarize, any appropriate film can be selected. The polarizer is preferably a stretched film of a polymer film containing as a main component a polyvinyl alcohol-based resin, which contains a dichromatic substance. As the dichromatic substance, any appropriate one can be employed. Typical example of the dichromatic substance includes iodine and a dichromatic dye. In the present specification, the term "dichromatic" refers to optical anisotropy in which light absorption differs in two directions of an optical axis direction and a direction perpendicular thereto. Furthermore, the term "stretched film" refers to a polymer film having enhanced orientation of molecules in a specific direction obtained by applying tension to an unstretched film at an appropriate temperature.

The polarizer may have any appropriate thickness in accordance with the purpose. The polarizer has a thickness of preferably 5 µm to 50 µm, and more preferably 10 µm to 30 µm.

The polyvinyl alcohol-based resin may be prepared by saponifying vinyl ester-based polymer obtained by polymerizing a vinyl ester-based monomer. Examples of the vinyl ester-based monomer include vinyl formate, vinyl acetate, vinyl propionate, vinyl valerate, vinyl laurate, vinyl stearate, vinylbenzoate, vinyl pivalate, and vinyl versatate.

A degree of saponification of the polyvinyl alcohol-based resin is preferably 95.0 mol % to 99.9 mol %. The degree of saponification of the polyvinyl alcohol-based resin may be determined in accordance with JIS K 6726-1994. Use of the polyvinyl alcohol-based resin, the degree of saponification of which falls within the above ranges, can provide a polarizer having excellent durability.

The polyvinyl alcohol-based resin may have any suitable average degree of polymerization in accordance with the purpose. The average degree of polymerization is preferably 1,200 to 3,600. The average degree of polymerization of the polyvinyl alcohol-based resin can be measured through a method in accordance with JIS K 6726-1994.

As a method of obtaining a polymer film containing the polyvinyl alcohol-based resin as a main component, any suitable forming method can be adopted. As a specific example of the forming method, there is a method described in JP 2000-315144 A [Example 1].

The polymer film containing as a main component the polyvinyl alcohol-based resin may preferably contain polyvalent alcohol as a plasticizer. The polyvalent alcohol is used for the purpose of further enhancing coloring properties and stretching properties of a polarizer. Examples of the polyvalent alcohol include ethylene glycol, glycerin, propylene glycol, diethylene glycol, triethylene glycol, tetraethylene glycol, and trimethylolpropane. The polyvalent alcohol may be used independently or in combination. The content (weight ratio) of the polyvalent alcohol is preferably more than 0 to 30 with respect to 100 of a total solid content in the polyvinyl alcohol-based resin.

A polymer film containing the polyvinyl alcohol-based resin as a main component may further contain a surfactant. The surfactant is used for the purpose of further enhancing coloring properties and stretching properties of a polarizer. The surfactant is preferably a nonionic surfactant. Specific examples of the nonionic surfactant include lauric diethanolamide, coconut oil fatty acid diethanolamide, coconut oil fatty acid monoethanolamide, lauric monoisopropanolamide, and oleic monoisopropanolamide. The content (weight ratio) of the surfactant is preferably more than 0 and 5 or less with respect to 100 of the polyvinyl alcohol-based resin.

Examples of the dichromatic dye include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black.

As the polymer film containing a polyvinyl alcohol-based resin as a main component, a commercially available product can be used as it is. Specific examples of the commercially available polymer film include "Kuraray Vinylone Film" (trade name) manufactured by Kuraray Co., Ltd., "Tohcello Vinylone Film" (trade name) manufactured by Tohcello Co., Ltd., and "Nichigo Vinylone Film" (trade name) manufactured by The Nippon Synthetic Chemical Industry, Co., Ltd.

Figure 3:
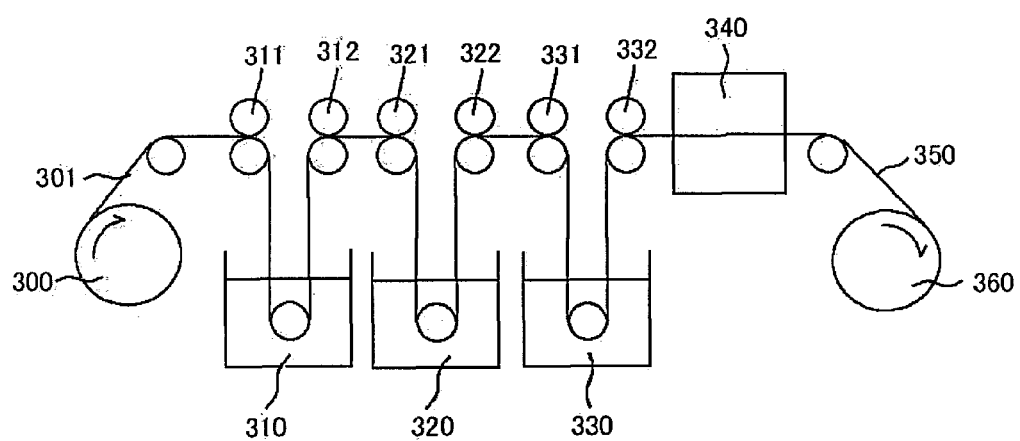
FIG. 3 Schematic diagram illustrating a concept of a typical production process of a polarizer used in the present invention.

An example of a method of producing a polarizer will be described by referring to FIG. 3. FIG. 3 is a schematic diagram showing a concept of a typical production process of a polarizer used in the present invention. For example, a polymer film 301 containing as a main component a polyvinyl alcohol-based resin is fed from a feed roller 300, immersed in an aqueous iodine solution bath 310, and subjected to swelling and coloring treatment under tension in a longitudinal direction of the film by rollers 311 and 312 at different speed ratios. Next, the film is immersed in a bath 320 of an aqueous solution containing boric acid and potassium iodide, and subjected to crosslinking treatment under tension in a longitudinal direction of the film by rollers 321 and 322 at different speed ratios. The film subjected to crosslinking treatment is immersed in a bath 330 of an aqueous solution containing potassium iodide by rollers 331 and 332, and subjected to water washing treatment. The film subjected to water washing treatment is dried by drying means 340 to adjust its moisture content to, for example, 10% to 30%, and taken up in a take-up part 360. The polymer film containing as a main component a polyvinyl alcohol-based resin may be stretched to a 5 to 7 times length of the original length through the above process, to thereby provide a polarizer 350.

D. Biaxial Optical Element

The refractive index ellipsoid of a biaxial optical element to be used in the present invention has the relationship of nx>nz>ny. When the relationship is represented by using Re[590] and Rth[590], the above biaxial optical element satisfies the following formula (1).

$$10 \text{ nm} \leq Rth[590] < Re[590] \tag{1}$$

In the present invention, the above biaxial optical element is used for reducing the light leakage in an oblique direction, and increasing the contrast ratio in an oblique direction, of the liquid crystal display apparatus. In a liquid crystal display apparatus having two polarizers placed on both sides of a liquid crystal cell in such a manner that the directions of the absorption axes of the polarizers are perpendicular to each other, light typically leaks in an oblique direction. To be specific, when the longitudinal direction of the liquid crystal panel is defined as 0°, the quantity of leaked light tends to reach its maximum in an oblique direction with an azimuth angle of each of 45° and 135°. The liquid crystal display apparatus of the present invention can reduce the quantity of leaked light by using a biaxial optical element the refractive index ellipsoid of which has a specific relationship. As a result, a liquid crystal display apparatus having a high contrast ratio in an oblique direction can be obtained.

With reference to FIGS. 2(a) and 2(b), the biaxial optical element 30 is placed between the liquid crystal cell 10 and the first polarizer 21. The direction of the slow axis of the above biaxial optical element 30 is substantially parallel to the direction of the absorption axis of the first polarizer 21. When the biaxial optical element is used so as to satisfy a specific positional relationship as described above, a liquid crystal display apparatus having the following characteristics can be obtained by virtue of a synergistic effect with the relationship between the wavelength dispersion values ($D_1 \geq D_2$): a contrast ratio between a front direction and an oblique direction is maintained at a higher level, and, in the case where one views the screen of the apparatus from an oblique direction, the contrast ratio is constant even when he or she views the screen in any direction of 0° to 360°. Further, the first polarizer and the biaxial optical element can be continuously stuck to each other with a long film, whereby the productivity of a liquid crystal panel can be significantly improved. It should be noted that the phrase "substantially parallel" as used in the present specification includes the case where an angle formed between two directions (here, an angle formed between the direction of the slow axis of the biaxial optical element 30 and the direction of the absorption axis of the first polarizer 21) is 0°±2.0°, and the angle is preferably 0°±1.0°, and more preferably 0°±0.5°. A liquid crystal display apparatus having a higher contrast ratio between a front direction and an oblique direction can be obtained as an angle shift between the direction of the slow axis of the biaxial optical element and the direction of the absorption axis of the first polarizer becomes smaller.

D-1. Optical Characteristics of Biaxial Optical Element

An appropriate value can be selected for Re[590] of the above biaxial optical element so as to satisfy the above formula (1). Re[590] of the above biaxial optical element is 10 nm or more, preferably 100 nm to 300 nm, more preferably 120 nm to 280 nm, particularly preferably 180 nm to 280 nm, and most preferably 250 nm to 280 nm. Setting Re[590] within the above range can provide a liquid crystal display apparatus having an additionally high contrast ratio in an oblique direction.

An appropriate value can be selected for Re[480] of the above biaxial optical element. Re[480] of the above biaxial optical element is 10 nm or more, preferably 90 nm to 330 nm, more preferably 110 nm to 320 nm, particularly preferably 170 nm to 310 nm, and most preferably 245 nm to 305 nm. Setting Re [480] within the above range can provide a liquid crystal display apparatus having an additionally high contrast ratio in an oblique direction.

A difference (Re[480]−Re[590]) between Re[480] and Re[590] of the above biaxial optical element is preferably −30 nm to 30 nm, more preferably −20 nm to 20 nm, particularly preferably −10 nm to 10 nm, and most preferably −5 nm to 5 nm. Setting the difference between Re[480] and Re[590] of the above biaxial optical element within the above range can provide a liquid crystal display apparatus having an additionally high contrast ratio in an oblique direction.

The wavelength dispersion value ($D_1$) of the above biaxial optical element is equal to or larger than the wavelength dispersion value ($D_2$) of the negative C plate to be described later. The wavelength dispersion value ($D_1$) of the above biaxial optical element is preferably 0.90 to 1.10, more preferably 0.92 to 1.08, particularly preferably 0.95 to 1.05, and most preferably 0.98 to 1.02. When a biaxial optical element having a wavelength dispersion value ($D_1$) in the above range is used so as to satisfy a specific positional relationship, a liquid crystal display apparatus having the following characteristics can be obtained: a contrast ratio in an oblique direction is high, and, in the case where one views the screen of the apparatus in an oblique direction, the contrast ratio is constant even when he or she views the screen in any azimuth of 0° to 360°.

Any appropriate method can be adopted as a method of adjusting the wavelength dispersion value ($D_1$) of the above biaxial optical element. As shown in, for example, JP 5-027119 A, FIG. 2, the above wavelength dispersion value can be set to any value by selecting an appropriate material as a material for forming the biaxial optical element. In addition, the above wavelength dispersion value can be adjusted depending on the molecular design of the material for forming the biaxial optical element. To be specific, as described in, for example, WO 00/26705, the above wavelength dispersion value can be set to any value depending on the types of two kinds of monomers to be used in a resin obtained by copolymerizing the monomers and a copolymerization ratio between the monomers in the resin. Alternatively, as described in a catalog "PURE-ACE" (2005), p. 8 available from TEIJIN CHEMICALS LTD., an appropriate retardation film to be utilized can be selected from commercially available retardation films having different wavelength dispersion values.

An appropriate value can be selected for Rth[590] of the above biaxial optical element so as to satisfy the above formula (1). Rth[590] of the above biaxial optical element is smaller than Re[590], preferably 10 nm to 210 nm, more preferably 20 nm to 180 nm, particularly preferably 50 nm to 180 nm, and most preferably 80 nm to 180 nm. Setting Rth [590] of the above biaxial optical element within the above range can provide a liquid crystal display apparatus having a high contrast ratio in an oblique direction.

A difference (Re[590]−Rth[590]) between Re[590] and Rth[590] of the above biaxial optical element is preferably 30 nm to 270 nm, more preferably 50 nm to 220 nm, particularly preferably 120 nm to 190 nm, and most preferably 150 nm to 190 nm. Setting the difference between Re[590] and Rth[590]

of the above biaxial optical element within the above range can provide a liquid crystal display apparatus having an additionally high contrast ratio in an oblique direction.

Re[480], Re[590], R40[480], R40[590] and Rth[590] may be determined by using "KOBRA-21ADH" (trade name, manufactured by Oji Scientific Instruments). Refractive indices nx, ny, and nz can be determined by: using an in-plane retardation value (Re) determined at a wavelength of 590 nm at 23° C., a retardation value (R40) determined by inclining a slow axis by 40° as a tilt angle, a thickness (d) of a retardation film, and an average refractive index (n0) of the retardation film; and using the following equations (i) to (iii) for computational numerical calculation. Then, Rth can be calculated from the following equation (iv). Here, $\Phi$ and ny' are represented by the following respective equations (v) and (vi).

$$Re = (nx - ny) \times d \quad \text{(i)}$$

$$R40 = (nx - ny') \times d / \cos(\Phi) \quad \text{(ii)}$$

$$(nx + ny + nz)/3 = n0 \quad \text{(iii)}$$

$$Rth = (nx - nz) \times d \quad \text{(iv)}$$

$$\Phi = \sin^{-1}[\sin(40°)/n0] \quad \text{(v)}$$

$$ny' = ny \times nz / [ny^2 \times \sin^2(\Phi) + nz^2 \times \cos^2(\Phi)]^{1/2} \quad \text{(vi)}$$

An Nz coefficient of the biaxial optical element is more than 0 and less than 1. In other words, the refractive index ellipsoid of the biaxial optical element satisfies the relationship of nx>nz>ny. The Nz coefficient is preferably 0.1 to 0.7, more preferably 0.1 to 0.6, particularly preferably 0.3 to 0.6, and most preferably 0.4 to 0.6. Setting the Nz coefficient within the above range can provide a liquid crystal display apparatus having a high contrast ratio in an oblique direction.

D-2. Means for Placing Biaxial Optical Element

With reference to FIGS. 1(a) and 1(b), any appropriate method can be adopted as a method of placing the biaxial optical element 30 depending on purposes. When the constitution shown in FIG. 1(a) is adopted, adhesion layers (not shown) are preferably provided between the biaxial optical element 30 and the first polarizer 21, and between the biaxial optical element 30 and the liquid crystal cell 10, so the respective optical members are stuck to each other. When the constitution shown in FIG. 1(b) is adopted, adhesion layers (not shown) are preferably provided between the biaxial optical element 30 and the first polarizer 21, and between the biaxial optical element 30 and the negative C plate 40, so the respective optical members are stuck to each other. Filling a gap between the respective optical members with an adhesion layer as described above can prevent the optical axes of the respective optical members from becoming misaligned, or can prevent damages on the respective optical members due to abrasion thereof upon incorporation of the members into the liquid crystal display apparatus. Further, a detrimental effect of reflection or refraction occurring at an interface between the respective optical members can be reduced, so a liquid crystal display apparatus capable of displaying a clear image can be obtained.

An appropriate value can be selected for the thickness of each of the adhesion layers depending on purposes. The thickness of each of the above adhesion layers is typically 0.1 μm to 50 μm. When the thickness of each of the adhesion layers is set within the above range, an optical element or polarizer to be bonded neither floats nor peels, whereby an adhesive strength and an adhesion time each sufficient for practical use can be obtained.

Any adhesive layers, pressure-sensitive adhesive layers, and/or anchor coat layers can be adopted as the above adhesion layers. Each of the above adhesion layers is preferably a pressure-sensitive adhesive layer. This is because the pressure-sensitive adhesive layer has excellent stress relaxation property, and can prevent a strain from propagating through the optical element upon curling, shrinkage, or expansion of the liquid crystal cell. A commercially available optical pressure-sensitive adhesive double-coated tape can be used as it is as each of the above adhesion layers. The commercially available optical pressure-sensitive adhesive double-coated tape is, for example, a tape marketed under the trade name of "SK-2057" by Soken Chemical & Engineering Co., Ltd.

D-3. Constitution of Biaxial Optical Element

The constitution (laminated structure) of the biaxial optical element to be used in the present invention is not particularly limited as long as the optical characteristics described in the above section D-1 are satisfied. To be specific, the biaxial optical element may be a single retardation film, or may be a laminate formed of two or more retardation films. The above biaxial optical element is preferably formed of a single retardation film. This is because the liquid crystal display apparatus can be reduced in thickness and weight. When the above biaxial optical element is a laminate, the element may include an adhesion layer. When the laminate includes two or more retardation films, these retardation films may be identical to or different from each other. It should be noted that details about a retardation film are described later in a section D-4.

Re[590] and Rth[590] of each retardation film to be used in the above biaxial optical element can be suitably selected depending on the number of retardation films to be used. For example, when the biaxial optical element is formed of a single retardation film, Re[590] and Rth[590] of the retardation film are preferably equal to Re[590] and Rth[590] of the biaxial optical element, respectively. Therefore, for example, the retardation value of an adhesion layer to be used upon lamination of the biaxial optical element on a polarizer is preferably as small as possible. In addition, for example, when the biaxial optical element is a laminate including two or more retardation films, the laminate is preferably designed in such a manner that the sum of Re [590]'s of the respective retardation films is equal to Re[590] of the biaxial optical element, and the sum of Rth[590]'s of the films is equal to Rth[590] of the element.

To be specific, a biaxial optical element having Re[590] of 260 nm and Rth[590] of 130 nm can be obtained by laminating two retardation films each having Re[590] of 130 nm and Rth[590] of 65 nm in such a manner that the directions of the slow axes of the respective films are parallel to each other. For simplicity, only the case where the number of retardation films to be used is two or less has been described; needless to say, the present invention is applicable also to a laminate including three or more retardation films.

The total thickness of the above biaxial optical element, which varies depending on the constitution of the element, is preferably 20 μm to 200 μm, or more preferably 30 μm to 180 μm.

D-4. Retardation Film Used in Biaxial Optical Element

Any appropriate retardation film can be adopted as a retardation film to be used in the biaxial optical element depending on the wavelength dispersion value ($D_2$) of the negative C plate to be described later. The above retardation film preferably has the following characteristics: the film is excellent in, for example, transparency, mechanical strength, heat stability, and water-shielding property, and hardly causes optical unevenness owing to a strain.

The thickness of the above retardation film may vary depending on the number of films to be laminated. The total thickness of the biaxial optical element to be obtained is set to preferably 20 μm to 200 μm. For example, when the biaxial optical element is formed of a single retardation film, the thickness of the retardation film is preferably 20 μm to 200 μm (that is, the thickness is equal to the total thickness of the biaxial optical element). In addition, for example, when the biaxial optical element is a laminate of two retardation films, any appropriate thickness can be adopted as the thickness of each retardation film as long as the total of the thicknesses of the retardation films is the preferred total thickness of the biaxial optical element. Therefore, the thicknesses of the respective retardation films may be identical to or different from each other. In one embodiment where two retardation films are laminated, the thickness of one retardation film is preferably 10 μm to 100 μm.

The transmittance of the above retardation film at 23° C. measured with light having a wavelength of 590 nm is typically 80% or more, or preferably 90% or more. It should be noted that the biaxial optical element preferably has the same light transmittance as that described above. The theoretical upper limit for the above transmittance is 100%, and the feasible upper limit for the above transmittance is 96%.

The absolute value for the photoelastic coefficient of the above retardation film ($C[550]$ ($m^2/N$)) is preferably $1 \times 10^{-12}$ to $60 \times 10^{-12}$, more preferably $1 \times 10^{-12}$ to $10 \times 10^{-12}$, particularly preferably $1 \times 10^{-12}$ to $8 \times 10^{-12}$, and most preferably $1 \times 10^{-12}$ to $6 \times 10^{-12}$. The use of a retardation film having an absolute value of a photoelastic coefficient within the above range can provide a liquid crystal display apparatus having excellent display uniformity.

A retardation film having the following characteristic is preferably used as the above retardation film: a variation in angle of the slow axis of the film (also referred to as "alignment angle") among five measurement sites provided in the width direction of the film at equal intervals is ±2° or less. The variation is more preferably ±1° or less. It should be noted that the above variation in alignment angle is ideally 0. Setting the variation in alignment angle within the above range can provide a liquid crystal display apparatus having excellent display uniformity and capable of displaying a clear image. The above alignment angle can be suitably adjusted by stretching means, a stretching method, a stretching temperature, and a stretch ratio to be described later.

The biaxial optical element to be used in the present invention preferably includes a retardation film containing a thermoplastic resin showing a positive intrinsic birefringence. The above retardation film is preferably a polymer stretched film containing a thermoplastic resin showing a positive intrinsic birefringence. The term "thermoplastic resin showing a positive intrinsic birefringence" as used in the present specification refers to the following polymer film containing the resin: when the film is stretched in one direction, the direction in which a refractive index in a film surface increases (direction of the slow axis of the film) is substantially parallel to the direction in which the film is stretched. The use of a polymer film containing such thermoplastic resin showing a positive intrinsic birefringence enables the efficient production of a retardation film having the optical characteristics described in the above section D-1 by, for example, a stretching method involving the utilization of a shrinkable film to be described later.

Examples of the thermoplastic resin include: general purpose plastics such as a polyolefin resin, a cycloolefin-based resin, a polyvinyl chloride-based rein, a cellulose-based resin, and a polyvinylidene chloride-based resin; general purpose engineering plastics such as a polyamide-based resin, a polyacetal-based resin, a polycarbonate-based resin, a modified polyphenylene ether-based resin, a polybutylene terephthalate-based resin, and a polyethylene terephthalate-based resin; and super engineering plastics such as a polyphenylene sulfide-based resin, a polysulfone-based resin, a polyether sulfone-based resin, a polyether ether ketone-based resin, a polyarylate-based resin, a liquid crystalline resin, a polyamideimide-based resin, a polyimide-based resin, and a polytetrafluoroethylene-based resin. The thermoplastic resins may be used alone or in combination of two or more. In addition, the thermoplastic resins can be used after any appropriate polymer modification. Examples of the polymer modification include copolymerization, crosslinking, molecular-terminal modification, and stereoregularity modification.

The biaxial optical element to be used in the present invention more preferably includes a retardation film containing a norbornene-based resin. The absolute value for the photoelastic coefficient of the retardation film containing a norbornene-based resin is small, so a liquid crystal display apparatus having excellent display uniformity can be obtained. The above biaxial optical element is particularly preferably constituted only of the retardation film containing a norbornene-based resin.

No retardation film having the relationship of $nx > nz > ny$ has been conventionally obtained with a stretched film containing a norbornene-based resin. This is because a polymer film containing the norbornene-based resin hardly shows a retardation value by virtue of stretching as compared to any other resin, and because it is difficult to stretch the film owing to the brittleness of the film itself. Moreover, a large stress must be applied to the film in order that a refractive index (nz) in the thickness direction of the film may be larger than one refractive index (ny) in the plane of the film, and the requirement has made the production of the retardation film additionally difficult. According to the present invention, a retardation film having the relationship of $nx > nz > ny$ can be actually obtained with a stretched film containing a norbornene-based resin by a production method involving the use of a specific shrinkable film.

In the present specification, norbornene-based resin refers to a (co)polymer obtained by using a norbornene-based monomer having a norbornene ring in a part or an entirety of a starting material (monomer). Note that in the present specification, the term "(co)polymer" represents a homopolymer or a copolymer.

As the norbornene-based resin, a norbornene-based monomer having a norbornene ring (having a double bond in a norbornane ring) as a starting material is used. The above norbornene-based resin may or may not have a norbornane ring in a constituent unit in a (co)polymer state. The norbornene-based resin having a norbornane ring in a constituent unit in a (co)polymer state is obtained using, for example, a monomer such as tetracyclo[$4.4.1^{2,5}.1^{7,10}$.0]deca-3-ene, 8-methyltetracyclo[$4.4.1^{2,5}.1^{7,10}$.0] deca-3-ene, or 8-methoxycarbonyltetracyclo[$4.4.1^{2,5}.1^{7,10}$.0]deca-3-ene. The norbornene-based resin having no norbornane ring in a constituent unit in a (co)polymer state is a (co)polymer obtained using, for example, a monomer that becomes a 5-membered ring by cleavage. Examples of the above monomer that becomes a 5-membered ring by cleavage include norbornene, dicyclopentadiene, 5-phenylnorbornene, and their derivatives. In the case where the above norbornene-based resin is a copolymer, the arrangement state of the repeating units thereof is not particularly limited, and the copolymer may be a random copolymer, a block copolymer, or a graft copolymer.

A commercially available norbornene-based resin can be used as it is as the above norbornene-based resin. Alternatively, the commercially available norbornene-based resin may be subjected to any appropriate polymer modification before use. Examples of the commercially available norbornene-based resin include: ARTON series manufactured by JSR (trade names; ARTON FLZR50, ARTON FLZR70, ARTON FLZL100, ARTON F5023, ARTON FX4726, ARTON FX4727, ARTON D4531, ARTON D4532, and the like); ZEONOR series manufactured by ZEON CORPORATION (trade names; ZEONOR 750R, ZEONOR 1020R, ZEONOR 1600, and the like); APL series manufactured by Mitsui Chemicals, Inc. (APL 8008T, APL 6509T, APL 6011T, APL 6013T, APL 6015T, APL 5014T, and the like); and a COC resin manufactured by TICONA (trade name; TOPAS).

Examples of the above norbornene-based resin include (A) a resin obtained through hydrogenation of a ring-opened (co)polymer of a norbornene-based monomer, and (B) a resin obtained through addition (co)polymerization of a norbornene-based monomer. The ring-opened copolymer of a norbornene-based monomer includes a resin obtained through hydrogenation of a ring-opened copolymer of at least one norbornene-based monomer and α-olefins, cycloalkenes, and/or non-conjugate dienes. The above resin obtained through addition (co) polymerization of a norbornene-based monomer includes a resin obtained through addition (co) polymerization of at least one norbornene-based monomer and α-olefins, cycloalkenes, and/or non-conjugate dienes. As the norbornene-based resin, (A) the resin obtained through hydrogenation of a ring-opened (co)polymer of a norbornene-based monomer is preferred. Such a resin has excellent forming property, as a result, a retardation film having a large retardation value can be obtained by a small stretch ratio.

The above resin obtained through hydrogenation of a ring-opened (co)polymer of a norbornene-based monomer can be obtained by subjecting a norbornene-based monomer or the like to a metathesis reaction to obtain a ring-opened (co)polymer, and further by hydrogenating the ring-opened (co) polymer. Specific examples include a method described in "Development and applied techniques of optical polymer materials", published by NTS Inc., p. 103 to p. 111 (2003); a method described in paragraphs [0059] to [0060] in JP 11-116780 A; a method described in paragraphs [0035] to [0037] of JP 2001-350017 A; and a method described in paragraph [0053] in JP2005-008698A. The above resin obtained through addition (co)polymerization of the norbornene-based monomer can be obtained by, for example, a method described in Example 1 of JP 61-292601 A.

Regarding the weight average molecular weight (Mw) of the above norbornene-based resin, the value measured by a gel permeation chromatograph (GPC) with a tetrahydrofuran solvent is preferably 20,000 to 500,000, and more preferably 30,000 to 200,000. The weight average molecular weight is a value measured by a method in accordance with Examples as described below. The weight average molecular weight within the above range can provide a film having excellent mechanical strength, solubility, forming property, and casting operability.

The glass transition temperature (Tg) of the above norbornene-based resin is preferably 110° C. to 185° C., more preferably 120° C. to 170° C., and particularly preferably 125° C. to 150° C. If the Tg is 110° C. or more, a film having excellent heat stability is likely to be obtained. If the Tg is 185° C. or less, it is possible to obtain a film in which an in-plane and thickness direction retardation value is easy to control by stretching. The glass transition temperature (Tg) is a value calculated by the DSC method pursuant to JIS K 7121.

As a method of obtaining the above polymer film containing a norbornene-based resin, any suitable forming method can be adopted. Examples of the forming method include compression molding, transfer molding, injection molding, extrusion molding, blow molding, powder molding, FRP molding, and solvent casting. Among them, solvent casting is preferred. This is because a polymer film having excellent smoothness and optical uniformity can be obtained.

The above solvent casting method is specifically a method of defoaming a concentrated solution (dope) in which a resin composition containing a resin as a main component, an additive, and the like are dissolved, flow-casting the resultant solution uniformly in a sheet shape on the surface of an endless stainless belt or a rotation drum, and evaporating the solvent to form a film. As the condition adopted during film formation, any appropriate condition can be selected depending upon the purpose.

The above polymer film containing a norbornene-based resin can further contain any suitable additives. Examples of the additive include a plasticizer, a heat stabilizer, a light stabilizer, a lubricant, an antioxidant, a UV-absorber, a flame retardant, a colorant, an antistatic agent, a compatibilizer, a cross-linking agent, and a thickener. The content (weight ratio) of the above additive is preferably more than 0 and 10 or less, with respect to 100 of the above norbornene-based resin.

A polymer film containing the above norbornene-based resin may be obtained from a resin composition containing the norbornene-based resin and any other resin. Any appropriate resin can be selected as the above other resin. The above other resin is preferably a styrene-based resin. The styrene-based resin can be used for adjusting the wavelength dispersion value or photoelastic coefficient of the retardation film. The content (weight ratio) of the above other resin is preferably more than 0 and 30 or less with respect to 100 of the above norbornene-based resin.

As the polymer film containing a norbornene-based resin, a commercially available film can be used as it is. Alternatively, a commercially available film subjected to a secondary treatment such as stretching and/or shrinking can be used. Examples of the commercially available polymer film containing a norbornene-based resin include Arton series (trade name: ARTON F, ARTON FX, and ARTON D) manufactured by JSR Corporation, and Zeonor series (trade name: ZEONOR ZF14 and ZEONOR ZF16) manufactured by OPTES Inc.

The above retardation film can be obtained by, for example, sticking a shrinkable film to each of both surfaces of the polymer film containing the norbornene-based resin and stretching the resultant under heat with a roll stretching machine by a longitudinal uniaxial stretching method. The shrinkable film is used for increasing the refractive index (nz) in the thickness direction of the polymer film by applying a shrinkage force in the direction perpendicular to the direction in which the resultant is stretched at the time of the stretching under heat. An appropriate method can be adopted as a method of sticking the above shrinkable film to each of both surfaces of the above polymer film depending on purposes. A method involving providing a pressure-sensitive adhesive layer containing an acrylic pressure-sensitive adhesive between the above polymer film and the above shrinkable film to cause the films to adhere to each other is preferred because the method has excellent productivity, workability, and economical efficiency.

Figure 4:
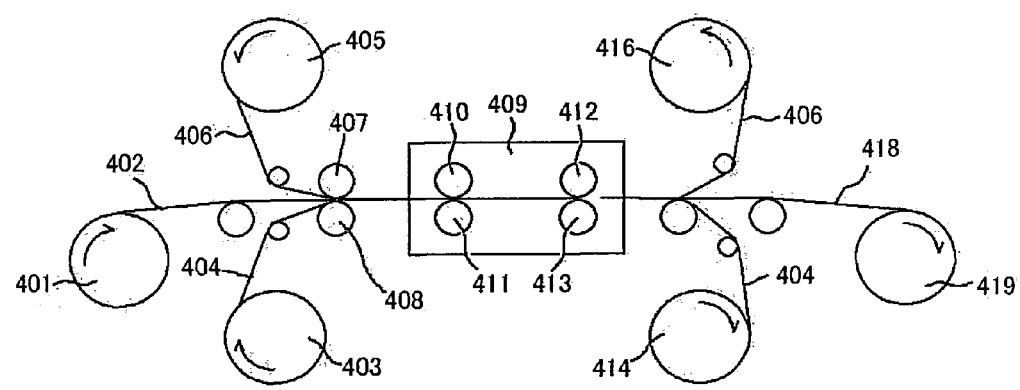
FIG. 4 Schematic diagram illustrating a concept of a typical production process of a retardation film used in the present invention.

An example of a method of producing the above retardation film will be described with reference to FIG. 4. FIG. 4 is a schematic view showing the concept of a representative production process for the retardation film to be used in the present invention. For example, a polymer film 402 containing a norbornene-based resin is fed from a first feeding portion 401, and a shrinkable film 404 which is provided with a pressure-sensitive adhesive layer and which is fed from a second feeding portion 403 and a shrinkable film 406 which is provided with a pressure-sensitive adhesive layer and which is fed from a third feeding portion 405 are stuck to both surfaces of the polymer film 402 by laminate rolls 407 and 408. While the temperature of the polymer film having the shrinkable films stuck to both of its surfaces is kept constant by heating means 409, tensions in the longitudinal direction of the film are applied to the film by rolls 410, 411, 412, and 413 at different speed ratios (under tension in a thickness direction by the shrinkable film at the same time), and, in the state, the polymer film is subjected to a stretching treatment. The shrinkable films 404 and 406 are peeled together with their pressure-sensitive adhesive layers from a film 418 subjected to the stretching treatment by a first winding portion 414 and a second winding portion 415, and the remainder is wound by a third winding portion 419.

The above shrinkable film is preferably a stretched film such as a biaxial stretched film or a uniaxial stretched film. The above shrinkable film can be obtained by, for example, stretching an unstretched film formed into a sheet shape by an extrusion method in a longitudinal direction and/or a transverse direction at a predetermined magnification with a simultaneous biaxial stretching machine or the like. It should be noted that conditions for the forming and the stretching can be suitably selected depending on the composition and kind of a resin to be used, and purposes.

A material to be used for the above shrinkable film is, for example, polyester, polystyrene, polyethylene, polypropylene, polyvinyl chloride, or polyvinylidene chloride. The above shrinkable film is preferably a biaxial stretched film containing polypropylene. Such shrinkable film has excellent shrinkage uniformity and heat resistance, so a target retardation value is obtained, and a retardation film having excellent optical uniformity can be obtained.

In one embodiment, the shrinkable film has a shrinkage ratio in a longitudinal direction of the film $S^{140}[MD]$ of preferably 4.5% to 7.7%, and a shrinkage ratio in a width direction of the film $S^{140}[TD]$ of preferably 8.1% to 15.4% at 140° C. More preferably, $S^{140}[MD]$ is 5.1% to 7.7% and $S^{140}[TD]$ is 10.2% to 15.4%.

In another embodiment, the shrinkable film has a shrinkage ratio in a longitudinal direction of the film $S^{160}[MD]$ of preferably 14.4% to 23.5%, and a shrinkage ratio in a width direction of the film $S^{160}[TD]$ of preferably 28.5% to 54.6% at 160° C. More preferably, $S^{160}[MD]$ is 15.7% to 23.5% and $S^{160}[TD]$ is 36.4% to 54.6%. Shrinkage ratios at each temperature within the above ranges can provide intended retardation values and a retardation film having excellent uniformity.

In one embodiment, a difference $\Delta S^{140} = S^{140}[TD] - S^{140}[MD]$ between the shrinkage ratio in a width direction of the film $S^{140}[TD]$ and the shrinkage ratio in a longitudinal direction of the film $S^{140}[MD]$ falls within a range of preferably $1.5\% \leq \Delta S^{140} \leq 7.7\%$, more preferably $5.1\% \leq \Delta S^{140} \leq 7.7\%$ at 140° C. In another embodiment, a difference $\Delta S^{160} = S^{160}[TD] - S^{160}[MD]$ between the shrinkage ratio in a width direction of the film $S^{160}[TD]$ and the shrinkage ratio in a longitudinal direction of the film $S^{140}[MD]$ falls within a range of preferably $14.1\% \leq \Delta S^{160} \leq 31.1\%$, preferably $20.7\% \leq \Delta S^{160} \leq 31.1\%$ at 160° C. A large shrinkage ratio in an MD direction may cause difficulties in uniform stretching due to shrinkage force of the shrinkable film on a stretching machine, in addition to stretching tension. The difference within the above ranges allows uniform stretching without applying excess load to facilities such as a stretching machine.

The shrinkable film preferably has a shrinkage stress in a width direction $T^{140}[TD]$ of 0.36 N/2 mm to 0.80 N/2 mm, more preferably 0.50 N/2 mm to 0.80 N/2 mm at 140° C. The shrinkable film preferably has a shrinkage stress in a width direction $T^{150}[TD]$ of 0.44 N/2 mm to 0.90 N/2 mm, more preferably 0.60 N/2 mm to 0.90 N/2 mm at 150° C. The shrinkage stress of the shrinkable film within the above ranges can provide intended retardation values and a retardation film having excellent uniformity.

The shrinkage ratios S[MD] and S[TD] can be determined in accordance with a heat shrinkage ratio A method of JIS Z 1712-1997 (except that: a heating temperature is changed from 120° C. to 140° C. (or 160° C.) as described above; and a load of 3 g is added to a sample piece). To be specific, five samples having a width of 20 mm and a length of 150 mm are sampled from a longitudinal direction (machine direction MD) and a width direction (transverse direction TD), respectively. The sample pieces are each marked at a distance of about 100 mm at a center. The sample pieces each with a load of 3 g are hung vertically into an air-circulating thermostatic bath maintained at 140° C.±3° C. (or 160° C.±3° C.). The sample pieces are heated for 15 min, taken out of the thermostatic bath, and left standing under standard conditions (room temperature) for 30 min. Then, the distances between marks are measured by using a caliper in accordance with JIS B 7507, to thereby obtain an average of five measured values. A shrinkage ratio can be calculated from an equation S(%)= [(distance between marks (mm) before heating−distance between marks (mm) after heating)/distance between marks (mm) before heating]×100.

A commercially available shrinkable film used for applications such as general packaging, food packing, pallet wrapping, shrinkable labels, cap seals, and electrical insulation can be appropriately selected and used as the above-described shrinkable film as long as the above properties such as shrinkage ratio can be satisfied. The commercially available shrinkable film may be used as it is, or may be used after the shrinkable film is subjected to secondary fabrication such as stretching treatment or shrinking treatment. Specific examples of the commercially available shrinkable film include: "ALPHAN series" such as ALPHAN P, ALPHAN S, or ALPHAN H (trade name, available from Oji paper Co., Ltd.); "FANCYTOP series" such as FANCYTOP EP1 or FANCYTOP EP2 (trade name, available from Gunze Ltd.); "TORAYFAN BO series" (trade name, for example, product Nos. 2570, 2873, 2500, 2554, M114, and M304, available from Toray Industries, Inc.); "SUN•TOX-OP series" (trade name, for example, product Nos. PA20, PA21 and PA30, available from SUN•TOXCo., Ltd.); and "TOHCELLO OP series" (tradename, for example, product Nos. OPU-0, OPU-1 and OPU-2, available from TOHCELLO Co., Ltd.).

A temperature (also referred to as stretching temperature) inside an oven for heat-stretching the laminate of the polymer film containing the norbornene-based resin and the shrinkable film may appropriately be selected in accordance with the intended retardation values, the kind or thickness of the polymer film to be used, and the like. The stretching temperature is preferably in a range of Tg+1° C. to Tg+30° C. with respect to a glass transition temperature (Tg) of the polymer film. The retardation value of the retardation film becomes uniform and the film hardly crystallizes (becomes clouded) within the above-mentioned temperature range. To be more specific, the stretching temperature is preferably 110° C. to 185° C. Note that the glass transition temperature (Tg) may be determined through a DSC method in accordance with JIS K 7121-1987.

Further, the magnification at which the laminate of the polymer film containing the norbornene-based resin and the shrinkable films is stretched (stretch ratio) can be suitably selected depending on, for example, a target retardation value, and the kind and thickness of the polymer film to be used. The above stretch ratio is typically more than 1 and 2 or less with respect to the original length of the laminate. The speed at which the laminate is fed at the time of the stretching is typically 1 m/min to 20 m/min in terms of the machine accuracy and stability of a stretching device. Under the above stretching conditions, a target retardation value is obtained, and a retardation film having excellent optical uniformity can be obtained.

E. Negative C Plate

In the present specification, the term "negative C plate" refers to an optical element in which the refractive index ellipsoid satisfies a relationship of nx=ny>nz. Ideally, the optical element in which the refractive index ellipsoid satisfies a relationship of nx=ny>nz has an optical axis in a normal line direction. In the present specification, nx=ny refers to not only a case where nx and ny are completely equal but also refers to a case where nx and ny are substantially equal. The phrase "case where nx and ny are substantially equal" includes a case where an in-plane retardation value (Re[590]) is 10 nm or less.

When the relationship of the above refractive index ellipsoid, that is, nx=ny>nz is represented by using Re[590] and Rth[590], the above negative C plate satisfies the following formulae (3) and (4).

$$Re[590]<10 \text{ nm} \quad (3)$$

$$10 \text{ nm} \leq Rth[590] \quad (4)$$

Figure 5:
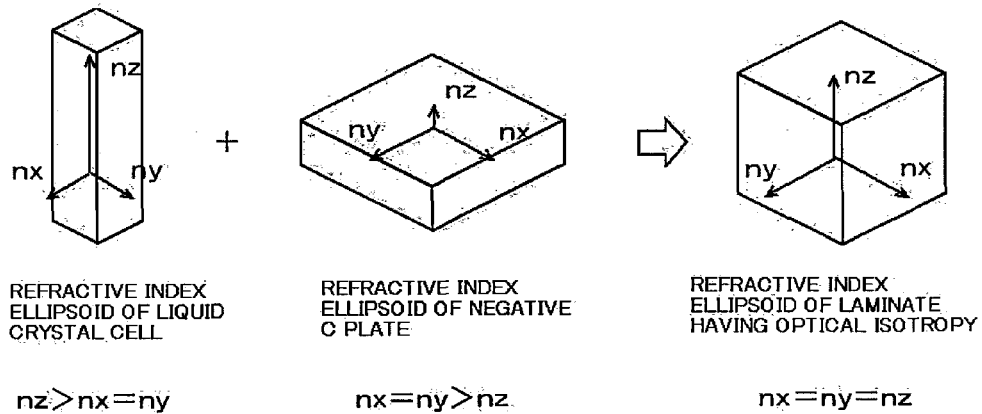
FIG. 5 Schematic diagram illustrating a typical concept of a method of canceling retardation of a liquid crystal cell by using a negative C plate.

In the present invention, the above negative C plate is used for optically compensating for and canceling the thickness direction retardation value $(Rth[590]_{LC})$ of the liquid crystal cell in the absence of an electric field. FIG. 5 is a representative conceptual view for describing a method of canceling the retardation value of the liquid crystal cell with the negative C plate. The phrase "canceling the retardation value of the liquid crystal cell" as used in the present specification refers to such optical compensation that the laminate of the liquid crystal cell and the negative C plate is substantially isotropic. As shown in FIG. 5, the laminate of the liquid crystal cell and the negative C plate substantially has isotropy, and its refractive index ellipsoid has the relationship of nx=ny=nz.

The absolute value for the sum of the thickness direction retardation value $(Rth[590]_2)$ of the above negative C plate and the thickness direction retardation value $(Rth[590]_{LC})$ of the above liquid crystal cell in the absence of an electric field $(|Rth[590]_2+Rth[590]_{LC}|)$ is preferably 50 nm or less, more preferably 30 nm or less, and particularly preferably 10 nm or less. Setting the absolute value within the above range can provide a liquid crystal display apparatus having a high contrast ratio in an oblique direction.

With reference to FIGS. 2(a) and 2(b), the negative C plate 40 is placed between the second polarizer 22 and the biaxial optical element 30. In one embodiment, as shown in FIG. 2(a), the negative C plate 40 is placed between the liquid crystal cell 10 and the second polarizer 22. In another embodiment, as shown in FIG. 2(b), the negative C plate 40 is placed between the liquid crystal cell 10 and the biaxial optical element 30. In still another embodiment, two negative C plates are placed between the liquid crystal cell 10 and the second polarizer 22, and between the liquid crystal cell 10 and the biaxial optical element 30 (this embodiment is not shown). In this case, the thickness direction retardation values of the negative C plates are preferably set in such a manner that the absolute value for the sum of the total of their retardation values and the thickness direction retardation value of the above liquid crystal cell is 50 nm or less.

When nx and ny of the negative C plate 40 are completely identical to each other, the slow axis of the negative C plate is not detected because the plate shows no in-plane retardation value. In this case, the negative C plate 40 can be placed irrespective of the direction of the absorption axis of the first polarizer 21, the direction of the absorption axis of the second polarizer 22, and the direction of the slow axis of the biaxial optical element 30. When nx and ny of the negative C plate are substantially identical to each other, but nx and ny are different from each other, the slow axis of the negative C plate may be detected (the negative C plate shows a slight in-plane retardation value) in some cases. In such cases, the above negative C plate 40 is preferably placed in such a manner that the direction of its slow axis is substantially parallel to or substantially perpendicular to the direction of the absorption axis of the second polarizer 22. When the negative C plate has an in-plane retardation value, a liquid crystal display apparatus having a higher contrast ratio between a front direction and an oblique direction can be obtained as an angle shift between the direction of the slow axis of the negative C plate and the direction of the absorption axis of the second polarizer becomes smaller.

E-1. Optical Characteristics of Negative C Plate

Re[590] of the above negative C plate is less than 10 nm, preferably 8 nm or less, or more preferably 5 nm or less. Setting Re[590] within the above range can provide a liquid crystal display apparatus having a high contrast ratio in an oblique direction.

An appropriate value can be selected for $Rth[590]_2$ of the above negative C plate depending on the thickness direction retardation value $(Rth[590]_{LC})$ of the above liquid crystal cell. $Rth[590]_2$ described above is preferably 150 nm to 550 nm, more preferably 150 nm to 450 nm, and particularly preferably 200 nm to 400 nm. Setting $Rth[590]_2$ within the above range can provide a liquid crystal display apparatus having a high contrast ratio in an oblique direction.

The wavelength dispersion value $(D_2)$ of the above negative C plate is equal to or smaller than the wavelength dispersion value $(D_1)$ of the biaxial optical element described above. The wavelength dispersion value $(D_2)$ of the above negative C plate is preferably 0.70 to 1.10, more preferably 0.72 to 1.05, particularly preferably 0.77 to 0.99, and most preferably 0.83 to 0.94. When a negative C plate having a wavelength dispersion value $(D_2)$ in the above range is used so as to satisfy a specific positional relationship, a liquid crystal display apparatus having the following characteristics can be obtained: a contrast ratio in an oblique direction is high, and, in the case where one views the screen of the liquid crystal display apparatus in an oblique direction, the contrast ratio is constant even when he or she views the screen in any azimuth of 0° to 360°. It should be noted that, for example, any appropriate method as described in the section D-1 can be adopted as a method of adjusting the above wavelength dispersion value $(D_2)$.

E-2. Means for Placing Negative C Plate

With reference to FIGS. 1(a) and 1(b), any appropriate method can be adopted as a method of placing the negative C plate 40 depending on purposes. When the constitution shown in FIG. 1(a) is adopted, adhesion layers (not shown) are preferably provided between the liquid crystal cell 10 and the negative C plate 40, and between the negative C plate 40 and the second polarizer 22, so the respective optical members are stuck to each other. When the constitution shown in FIG. 1(b) is adopted, adhesion layers (not shown) are preferably provided between the biaxial optical element 30 and the negative C plate 40, and between the negative C plate 40 and the liquid crystal cell 10, so the respective optical members are stuck to each other. Filling a gap between the respective optical members with an adhesion layer as described above can prevent the optical axes of the respective optical members from becoming misaligned, or can prevent damages on the respective optical members due to abrasion thereof upon incorporation of the members into the liquid crystal display apparatus. Further, a detrimental effect of reflection or refraction occurring at an interface between the layers of the respective optical members can be reduced, so a liquid crystal display apparatus capable of displaying a clear image can be obtained.

An appropriate value can be selected for the thickness of each of the adhesion layers depending on purposes. The thickness of each of the above adhesion layers is typically 0.1 μm to 50 μm. When the thickness of each of the adhesion layers is set within the above range, an optical element or polarizer to be bonded neither floats nor peels, whereby an adhesive strength and an adhesion time each sufficient for practical use can be obtained.

Any adhesive layers, pressure-sensitive adhesive layers, and/or anchor coat layers can be adopted as the above adhesion layers. Each of the above adhesion layers is preferably a pressure-sensitive adhesive layer. This is because the pressure-sensitive adhesive layer has excellent stress relaxation property, and can prevent a strain from propagating through the optical element upon curling, shrinkage, or expansion of the liquid crystal cell. A commercially available optical pressure-sensitive adhesive double-coated tape can be used as it is as each of the above adhesion layers. The commercially available optical pressure-sensitive adhesive double-coated tape is, for example, a tape marketed under the trade name of "SK-2057" by Soken Chemical & Engineering Co., Ltd.

E-3. Constitution of Negative C Plate

The constitution (laminated structure) of the negative C plate to be used in the present invention is not particularly limited as long as the optical characteristics described in the above section E-1 are satisfied. To be specific, the negative C plate may be a single retardation film, or may be a laminate formed of two or more retardation films. The above negative C plate is preferably formed of a single retardation film or two retardation films. When the above negative C plate is a laminate, the plate may include an adhesion layer. When the laminate includes two or more retardation films, these retardation films may be identical to or different from each other. It should be noted that details about a retardation film are described later in a section E-4.

Rth[590] of each retardation film to be used in the above negative C plate can be suitably selected depending on the number of retardation films to be used. For example, when the negative C plate is formed of a single retardation film, Rth [590] of the retardation film is preferably equal to Rth[590] of the negative C plate, respectively. Therefore, for example, the retardation value of an adhesion layer to be used upon lamination of the negative C plate on a polarizer is preferably as small as possible. In addition, for example, when the negative C plate is a laminate including two or more retardation films, the laminate is preferably designed in such a manner that the sum of Rth[590]'s of the respective retardation films is equal to Rth[590] of the negative C plate.

To be specific, a negative C plate having Rth[590] of 300 nm can be obtained by laminating two retardation films each having Rth[590] of 150 nm. Alternatively, the negative C plate can be obtained by laminating a retardation film having Rth[590] of 50 nm and a retardation film having Rth[590] of 250 nm. When two retardation films are laminated, the respective retardation films are preferably placed in such a manner that their slow axes are perpendicular to each other. This is because, according to such embodiment, even when the retardation films each have Re[590], Re [590] of each film can be reduced. For simplicity, only the case where the number of retardation films to be used is two or less has been described; needless to say, the present invention is applicable also to a laminate including three or more retardation films.

The total thickness of the above negative C plate, which varies depending on the constitution of the negative C plate, is preferably 20 μm to 400 μm, and more preferably 30 μm to 300 μm.

E-4. Retardation Film Used in Negative C Plate

Any appropriate retardation film can be adopted as a retardation film to be used in the negative C plate depending on the wavelength dispersion value ($D_1$) of the biaxial optical element to be described above. The above retardation film preferably has the following characteristics: the film is excellent in, for example, transparency, mechanical strength, heat stability, and water-shielding property, and hardly causes optical unevenness owing to a strain.

The thickness of the above retardation film may vary depending on the number of films to be laminated. The total thickness of the negative C plate to be obtained is set to preferably 20 μm to 200 μm. For example, when the negative C plate is formed of a single retardation film, the thickness of the retardation film is preferably 20 μm to 200 μm (that is, the thickness is equal to the total thickness of the negative C plate). In addition, for example, when the negative C plate is a laminate of two retardation films, any appropriate thickness can be adopted as the thickness of each retardation film as long as the total of the thicknesses of the retardation films is the preferred total thickness of the negative C plate. Therefore, the thicknesses of the respective retardation films may be identical to or different from each other. In one embodiment where two retardation films are laminated, the thickness of one retardation film is preferably 10 μm to 100 μm.

The transmittance of the above retardation film at 23° C. measured with light having a wavelength of 590 nm is typically 80% or more, or preferably 90% or more. It should be noted that the negative C plate preferably has the same light transmittance as that described above. The theoretical upper limit for the above transmittance is 100%, and the feasible upper limit for the above transmittance is 96%.

The absolute value for the photoelastic coefficient of the above retardation film (C[550] ($m^2/N$)) is preferably $1 \times 10^{-12}$ to $80 \times 10^{-12}$, more preferably $1 \times 10^{-12}$ to $50 \times 10^{-12}$, and particularly preferably $1 \times 10^{-12}$ to $30 \times 10^{-12}$. The use of a retardation film having an absolute value of a photoelastic coefficient within the above range can provide a liquid crystal display apparatus having excellent display uniformity.

The negative C plate to be used in the present invention preferably includes the retardation film containing a thermoplastic resin showing a positive intrinsic birefringence described in the section D-4. The negative C plate to be used in the present invention more preferably includes a retardation film containing a cellulose-based resin. The above retardation film may be a stretched film, or may be an unstretched film.

As the cellulose-based resin, any appropriate resin can be adopted. The cellulose-based resin is preferably a cellulose organic acid ester or a cellulose-mixed organic acid ester in which a part or an entirety of a hydroxyl group of cellulose is substituted by an acetyl group, a propionyl group and/or a butyloyl group. Specific examples of the cellulose organic acid ester include cellulose acetate, cellulose propionate, and cellulose butyrate. Specific examples of the cellulose-mixed organic acid ester include cellulose acetate propionate and cellulose acetate butyrate. The cellulose-based resin is produced, for example, by a method described in paragraphs [0040] and [0041] of JP 2001-188128 A.

In the case where the cellulose-based resin contains an acetyl group, the degree of acetyl substitution is preferably 1.5 to 3.0, more preferably 2.0 to 2.9, and particularly preferably 2.4 to 2.9. In the case where the cellulose-based resin contains a propionyl group, the degree of propionyl substitution is preferably 0.5 to 3.0, more preferably 1.0 to 2.9, and particularly preferably 2.3 to 2.8. In the case where the cellulose-based resin is a mixed organic acid ester in which hydroxyl groups of cellulose are substituted partly by an acetyl group and partly by a propionyl group, a total of degree of acetyl substitution and degree of propionyl substitution is preferably 1.5 to 3.0, more preferably 2.0 to 3.0, and particularly preferably 2.4 to 2.9. In this case, the degree of acetyl substitution is preferably 0.1 to 1.5, and the degree of propionyl substitution is preferably 1.5 to 2.9. The use of the above cellulose-based resin can provide a thin film having a large thickness direction retardation value.

In the present specification, a degree of acetyl substitution (or degree of propionyl substitution) refers to the number of hydroxyl groups, which are bonded to carbon atoms at 2, 3, and 6 positions in a cellulose main chain, substituted by acetyl groups (or propionyl groups). The acetyl groups (or propionyl groups) may unevenly substitute any carbon atoms at 2, 3, and 6 positions in a cellulose main chain, or may evenly substitute the carbon atoms at 2, 3, and 6 positions. The degree of acetyl substitution may be determined in accordance with ASTM-D817-91 (Standard Test Methods of Testing Cellulose Acetate and the Like). The degree of propionyl substitution may be determined in accordance with ASTM-D817-96 (Standard Test Methods of Testing Cellulose Acetate and the like).

A commercially available cellulose-based resin can be used as it is as the above cellulose-based resin. Alternatively, the commercially available resin may be subjected to any appropriate polymer modification before use. Examples of the above polymer modification include copolymerization, cross-linking, a molecular-terminal modification, and a stereoregularity modification. Examples of the commercial available cellulose-based resin include a cellulose acetate propionate resin manufactured by DAICEL FINECHEM LTD (product name; 307E-09, 360A-09, and 360E-16), cellulose acetate manufactured by Eastman Chemical Company (product name; CA-380-30, CA-398-30L, CA-320S, CA-394-60S, CA-398-10, CA-398-3, CA-398-30, and CA-398-6), cellulose butyrate manufactured by Eastman Chemical Company (product name; CAB-381-0.1, CAB-381-20, CAB-500-5, CAB-531-1, CAB-551-0.2, and CAB-553-0.4), and cellulose acetate propionate manufactured by Eastman Chemical Company (product name; CAP-482-0.5, CAP-482-20, and CAP-504-0.2).

A value for the weight average molecular weight (Mw) of the above cellulose-based resin measured by a gel permeation chromatography (GPC) method with a tetrahydrofuran solvent falls within the range of preferably 20,000 to 1,000,000, more preferably 25,000 to 800,000, particularly preferably 30,000 to 400,000, and most preferably 40,000 to 200,000. When the weight average molecular weight falls within the above range, a resin having excellent mechanical strength and having good solubility, good formability, and good casting workability can be obtained.

The glass transition temperature (Tg) of the above cellulose-based resin is preferably 110° C. to 185° C., more preferably 120° C. to 170° C., and particularly preferably 125° C. to 150° C. When Tg is 110° C. or higher, a film having good heat stability can be easily obtained, and, when Tg is 185° C. or lower, the resin has excellent formability. It should be noted that the glass transition temperature (Tg) can be determined by a DSC method in conformance with JIS K 7121.

Any appropriate forming method can be adopted as a method of obtaining a retardation film containing the above cellulose-based resin. The forming method is, for example, the method described in the section D-4. The forming method is preferably a solvent casting method. This is because a polymer film having excellent smoothness and optical uniformity can be obtained.

The polymer film containing the above cellulose-based resin may further contain any appropriate additive. Examples of the above additive include a plasticizer, a heat stabilizer, a light stabilizer, a lubricant, an antioxidant, a UV absorber, a flame retardant, a colorant, an antistatic agent, a compatibilizer, a cross-linking agent, and a thickening agent. An appropriate value can be set for the content (weight ratio) of the above additive depending on purposes. The content (weight ratio) of the above additive is preferably more than 0 and 20 or less with respect to 100 parts by weight of the above cellulose-based resin.

An appropriate value can be selected for the thickness of the above polymer film depending on, for example, a mechanical strength and a retardation value to be designed. The thickness of the above polymer film is typically 20 μm to 200 μm. When the thickness falls within the above range, the film has excellent mechanical strength, and can exhibit the optical characteristics described in the above section E-1.

A commercially available film can be used as it is as a retardation film containing the above cellulose-based resin. Alternatively, the commercially available film may be subjected to secondary processing such as a stretching treatment and/or a shrinkage treatment before use. Examples of the commercially available polymer film containing a cellulose-based resin include: FUJITAC series manufactured by FUJI-FILM Corporation (trade names; ZRF 80S and TD 80UF); and a product with a tradename "KC8UX2M" manufactured by Konica Minolta Opt.

F. Liquid Crystal Display Apparatus

Figure 6:
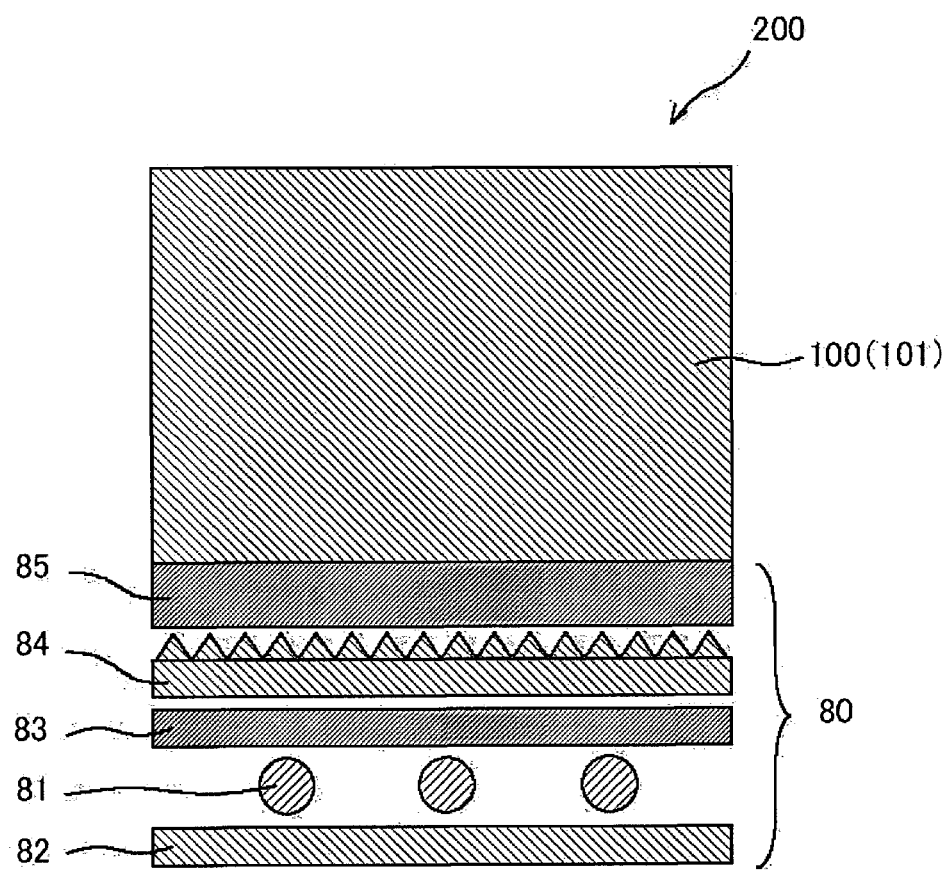
FIG. 6 Schematic cross-sectional view of a liquid crystal display apparatus according to a preferred embodiment of the present invention.

FIG. 6 is a schematic cross-sectional view of a liquid crystal display apparatus according to a preferred embodiment of the present invention. For ease of observation, it should be noted that the ratio of each constituent member in longitudinal, lateral, and thickness directions illustrated in FIG. 6 is different from the actual one. A liquid crystal display apparatus 200 includes a liquid crystal panel 100 (or 101) and a backlight unit 80 placed on one side of the liquid crystal panel 100 (or 101). In the illustrated example, the case where a backlight unit of a direct-type is adopted has been shown. However, for example, a sidelight-type may be used as a backlight unit. In the case where a direct-type is adopted, the backlight unit 80 preferably includes a light source 81, a reflective film 82, a diffusion plate 83, a prism sheet 84, and a brightness enhancing film 85. Preferably, the backlight unit further includes a light guide plate and a light reflector. By using such optical members, a liquid crystal display apparatus having further improved display properties can be obtained.

As long as the effects of the present invention are obtained, a part of the optical member illustrated in FIG. 6 may be omitted or may be replaced by another optical element, depending upon the application such as an illumination system of a liquid crystal display apparatus and a driving mode of a liquid crystal cell.

The liquid crystal display apparatus may be of a transmissive type in which a screen is observed by irradiation of light from a back surface of a liquid crystal panel, or may be of a reflection type in which the screen is observed by irradiation of light from a viewer side of the liquid crystal panel. Alternatively, the liquid crystal display apparatus may be of a semi-transmissive type which has both the properties of the transmissive type and the reflection type. The liquid crystal display apparatus of the present invention is preferably of a transmissive type. This is because a liquid crystal display apparatus having a high contrast ratio in an oblique direction can be obtained.

As the backlight unit, any appropriate configuration may be adopted. Typical example of the configuration of the backlight unit includes "direct-type" in which a liquid crystal panel is illuminated straightly from the below backlight and "a sidelight-type" in which a liquid crystal panel is illuminated from the backlight at the side end. The backlight unit is preferably of a direct-type. This is because a liquid crystal display apparatus having high brightness can be obtained.

An appropriate light source can be adopted as the above light source depending on purposes. Examples of the above light source include a cold-cathode fluorescent lamp (CCFL), a light-emitting diode (LED), an organic EL (OLED), and a field-emission device (FED). When a light-emitting diode is adopted as the light source, the colors of the light source may be a white color alone, or may be three colors, that is, R, G, and B colors. When an RGB three-color light source is used as the light-emitting diode, a field sequential liquid crystal display apparatus capable of displaying a color without using a color filter can be obtained.

The above reflective film is used for preventing light from escaping to the side opposite to the viewer side of the liquid crystal panel, and, furthermore, for allowing light from the backlight unit to be efficiently incident on the light guide plate. For example, a polyethylene terephthalate film onto which silver has been deposited by vapor deposition, or a laminated film obtained by laminating multiple layers each composed of a polyester-based resin is used as the above reflective film. The reflectance of the above reflective film is preferably 90% or more in the entire wavelength range of 410 nm to 800 nm. The thickness of the above reflective film is typically 50 µm to 200 µm. A commercially available reflective film can be used as it is as the above reflective film. Examples of the commercially available reflective film include: REFWHITE series manufactured by KIMOTO CO., LTD; and Vikuiti ESR series manufactured by Sumitomo 3M Limited.

The above light guide plate is used for distributing light from the backlight unit over the entirety of the screen of the liquid crystal display apparatus. A product obtained by forming, for example, an acrylic resin, a polycarbonate-based resin, or a cycloolefin-based resin into such a taper shape as to become thinner as the light guide plate is away from the light source is used as the above light guide plate.

The above diffusion plate is used for introducing light emitted from the light guide plate in such a manner that the light covers a wide angle to uniformize the brightness of the screen. For example, a polymer film subjected to an uneven surface treatment, or a polymer film containing a diffusing agent is used as the above diffusion plate. The haze of the above diffusion plate is preferably 85% to 92%. Further, the total light beam transmittance of the above diffusion plate is preferably 90% or more. A commercially available diffusion plate can be used as it is as the above diffusion plate. Examples of the commercially available diffusion plate include: OPLUS series manufactured by KEIWA Inc.; and LIGHTUP series manufactured by KIMOTO CO., LTD.

The above prism sheet is used for concentrating the wide angle light obtained by the light guide plate in a specific direction to improve the brightness in a front direction of the liquid crystal display apparatus. For example, a product obtained by laminating a prism layer composed of an acrylic resin or a photosensitive resin on the surface of a base film composed of a polyester-based resin is used as the above prism sheet. A commercially available prism sheet can be used as it is as the above prism sheet. Examples of the commercially available prism sheet include DIAART series manufactured by Mitsubishi Rayon Co., Ltd.

The above brightness enhancing film is used for improving the brightness in a front direction and an oblique direction of the liquid crystal display apparatus. A commercially available brightness enhancing film can be used as it is as the above brightness enhancing film. Examples of the commercially available brightness enhancing film include: NIPOCS PCF series manufactured by Nitto Denko Corporation; and Vikuiti DBEF series manufactured by Sumitomo 3M Limited.

G. Display Characteristic of Liquid Crystal Display Apparatus

The liquid crystal display apparatus including the liquid crystal panel of the present invention has an average of contrast ratios at a polar angle of 40° in all azimuths (azimuth angles of 0° to 360°) of preferably 120 or more, more preferably 140 or more, and particularly preferably 160 or more. Further, the above liquid crystal display apparatus has a minimum value for the contrast ratios at a polar angle of 40° in all azimuths (azimuth angles of 0° to 360°) of preferably 80 or more, more preferably 100 or more, and particularly preferably 120 or more. Further, the above liquid crystal display apparatus has a difference between the maximum value and the minimum value for the contrast ratios at a polar angle of 40° in all azimuths (azimuth angles of 0° to 360°) of preferably 100 or less, more preferably 90 or less, and particularly preferably 80 or less.

The above liquid crystal display apparatus has an average of contrast ratios at an azimuth angle of 45° and polar angles of 0° (front direction) to 80° of preferably 160 or more, more preferably 170 or more, and particularly preferably 180 or more. Further, the above liquid crystal display apparatus has a minimum value for the contrast ratios at an azimuth angle of 45° and polar angles of 0° (front direction) to 80° of preferably 10 or more, more preferably 12 or more, and particularly preferably 14 or more. It should be noted that the above contrast ratios are each a value calculated from a ratio of the Y value of a white image to the Y value of a black image (Y(white)/Y(black)) when the images are displayed on a display screen, and the above Y values are each a tristimulus value Y defined by a CIE 1931 XYZ display system.

H. Application of Liquid Crystal Display Apparatus

The liquid crystal display apparatus of the present invention may be used for any appropriate applications. Specific example of the application includes: office automation (OA) devices such as a personal computer monitor, a laptop personal computer, and a copying machine; portable devices such as a cellular phone, a watch, a digital camera, a personal digital assistance (PDA), and a portable game machine; home appliances such as a video camera, a liquid crystal television, and a microwave; in-car devices such as a back monitor, a car navigation system monitor, and a car audio; display devices such as a commercial information monitor; security devices such as a surveillance monitor; and nursing care/medical devices such as a nursing monitor and a medical monitor.

Preferably, the liquid crystal display apparatus of the present invention is applied to a television. The screen size of the television is preferably wide 17-type (373 mm×224 mm) or more, more preferably wide 23-type (499 mm×300 mm) or more, particularly preferably wide 26-type (566 mm×339 mm) or more, and most preferably wide 32-type (687 mm×412 mm) or more.

EXAMPLES

The present invention will be described in more detail by using the following examples and comparative examples. However, the present invention is not limited to the examples. Analytical methods used in the examples are described below.

(1) Method of Measuring Single Axis Transmittance, Degree of Polarization, Hue a-Value and Hue b-Value of Polarizing Plate:

The single axis transmittance, the degree of polarization, the hue a-value and the hue b-value were measured by using a spectrophotometer "DOT-3" (trade name, manufactured by Murakami Color Research Laboratory) at 23° C.

(2) Method of Measuring Molecular Weight

The molecular weight was calculated using polystyrene as a standard sample by gel permeation chromatography (GPC). Specifically, the molecular weight was measured by the following apparatus and appliance under the following measurement conditions.

Measurement sample: a filtrate was used, which was obtained by dissolving the obtained sample in tetrahydrofuran to obtain a 0.1% by weight of solution, allowing the solution to stand still overnight, and filtering the solution with a membrane filter of 0.45 μm.

Analysis apparatus: "HLC-8120GPC" manufactured by Tosoh Corporation
   Column: TSKgel SuperHM-H/H4000/H3000/H2000
   Column size: each 6.0 mm I.D.×150 mm
   Eluate: tetrahydrofuran
   Flow rate: 0.6 ml/minute
   Detector: RI
   Column temperature: 40° C.
   Injection amount: 20 μl (3) Method of Measuring Thickness In the case where the thickness is less than 10 μm, the thickness was measured using a spectrophotometer for a thin film "Instantaneous multi-measurement system MCPD-2000" (trade name) manufactured by Otsuka Electronics Co., Ltd. In the case where the thickness is 10 μm or more, the thickness was measured using a digital micrometer "KC-351C type" manufactured by Anritsu Corporation.

(4) Method of Measuring Average Refractive Index of Film

The average refractive index was obtained by using an Abbe refractometer "DR-M4" (trade name, manufactured by Atago Co., Ltd.) by using light with a wavelength of 589 nm at 23° C.

(5) Method of Measuring Retardation Values (Re[480], Re[590], R40[480], R40[590], Rth[480], Rth[590]):

The retardation values were measured by using an automatic birefringence analyzer "KOBRA-21ADH" (trade name) manufactured by Oji Scientific Instruments and by using light with wavelength of 480 nm and 590 nm at 23° C., respectively.

(6) Method of Measuring Transmittance (T[590]):

The transmittance was measured by using a UV-vis spectrophotometer "V-560" (trade name, manufactured by JASCO Corporation) by using light of a wavelength of 590 nm at 23° C.

(7) Method of Measuring Absolute Value (C[550]) of Photoelastic Coefficient

The retardation value (23° C./wavelength of 550 nm) of the center of a sample (size: 2 cm×10 cm) was measured while a stress (5 to 15 N) was being applied thereto, with both ends of the sample held, using a spectroscopic ellipsometer "M-220" (trade name, manufactured by JASCO Corporation), and the absolute value of the photoelastic coefficient was calculated from a slope of a function between the stress and the retardation value.

(8) Method of Measuring Shrinkage Ratio of Shrinkable Film:

The shrinkage ratios S(MD) and S(TD) were determined in accordance with a heat shrinkage ratio A method of JIS Z 1712-1997 (except that: a heating temperature was changed from 120° C. to 140° C. (or 160° C.); and a load of 3 g was added to a sample piece). To be specific, five samples having a width of 20 mm and a length of 150 mm were sampled from a longitudinal direction (machine direction (MD)) and a width direction (transverse direction (TD)), respectively. The sample pieces were each marked at a distance of about 100 mm at a center. The sample pieces each with a load of 3 g were hung vertically into an air-circulating thermostatic bath maintained at 140° C.±3° C. (or 160° C.±3° C.). The sample pieces were heated for 15 min, taken out of the thermostatic bath, and left standing under standard conditions (room temperature) for 30 min. Then, the distances between marks were measured by using a caliper in accordance with JIS B7507, to thereby obtain an average of five measured values. A shrinkage ratio was calculated from an equation S(%)=[(distance between marks (mm) before heating−distance between marks (mm) after heating)/distance between marks (mm) before heating]×100.

(9) Method of Measuring Shrinkage Stress of Shrinkable Film:

The shrinkage stresses in a width direction (TD) $T^{140}[TD]$ and $T^{150}[TD]$ were respectively measured at 140° C. and 150° C. through a TMA method by using the following apparatus.
   Apparatus: "TMA/SS 6100", manufactured by Seiko Instruments Inc.
   Data processing: "EXSTAR6000", manufactured by Seiko Instruments Inc.
   Measurement mode: measurement with constant temperature increase (10° C./min)
   Measurement atmosphere: atmosphere air (23° C.)
   Load: 20 mN
   Sample size: 15 mm×2 mm (longer side corresponds to width direction (TD))

(10) Method of Measuring Contrast Ratio of Liquid Crystal Display Apparatus

After backlight was turned on in a dark room at 23° C. for 30 minutes, measurement of a contrast ratio was performed by using the following method and measurement apparatus. A white image and a black image were displayed on a liquid crystal display apparatus, and Y values in an XYZ display system were measured by using "EZ Contrast 160D" (trade name, manufactured by ELDIM SA). A contrast ratio "YW/YB" was calculated from a Y value (YW) of the white image and a Y value (YB) of the black image. Note that the azimuth angle of 0° refers to a longer side of the panel. The polar angle of 0° refers to a normal line direction of the display screen.

<Production of Polarizer>

Reference Example 1

A commercially available polarizing plate [trade name "SIG 1423DU" manufactured by Nitto Denko Corporation] was used as it was. The polarizing plate includes a polarizer and a protective layer placed on each of both sides of the polarizer. The above protective layer substantially has isotropy, and has Re[590] of 0.5 nm and Rth[590] of 1.0 nm. Table 1 shows the characteristics of the above polarizing plate.

TABLE 1

|  | Reference Example 1 P1, P2 |
|---|---|
| Single axis transmittance (%) | 42.6 |
| Degree of polarization (%) | 99.99 |
| Hue a value | −1.5 |
| Hue b value | 3.8 |
| Material | Iodine-containing polyvinyl alcohol |

<Production of Biaxial Optical Element>

Reference Example 2

A shrinkable film A (biaxial stretched film having a thickness of 60 μm and containing polypropylene [trade name "Torayfan B02873" manufactured by Toray Industries, Inc.]) was stuck to each of both sides of a polymer film having a thickness of 100 μm and containing a resin obtained by hydrogenating the ring-opened polymer of a norbornene-based monomer (norbornene-based resin) [trade name "ZEONOR ZF-14-100" (average refractive index=1.52, Tg=136° C., Re[590]=3.0 nm, Rth[590]=5.0 nm) manufactured by OPTES INC.] through an acrylic pressure-sensitive adhesive layer (having a thickness of 15 μm). After that, the resultant film was stretched with a roll stretching machine at a magnification of 1.38 in an air-circulating oven at 146° C. while the film was held in its longitudinal direction. After the stretching, the above shrinkable film A was peeled together with the above acrylic pressure-sensitive adhesive layer, whereby a retardation film 1-A was produced. Table 2 shows the characteristics of the film. The refractive index ellipsoid of the retardation film 1-A showed the relationship of nx>nz>ny. Table 3 shows the properties of the above shrinkable film A.

TABLE 2

|  | Reference Example 2 | Reference Example 3 |
|---|---|---|
| Retardation film | 1-A | 1-B |
| Refractive index ellipsoid | nx > nz > ny | nx > nz > ny |
| Thickness (μm) | 108 | 59 |
| Transmittance (%) | 91 | 91 |
| Re[480](nm) | 272.7 | 288.9 |
| Re[590](nm) | 270.0 | 270.0 |
| Rth[590](nm) | 135.0 | 135.0 |
| Alignment angle (°) | ±0.7 | ±0.7 |
| Re[480]/Re[590] | 1.01 | 1.07 |
| Rth[590]/Re[590] | 0.5 | 0.5 |
| C[550] × $10^{-12}$(m$^2$/N) | 3.1 | 50.0 |

TABLE 3

| Shrinkable film |  | A | B |
|---|---|---|---|
| Shrinkage ratio in longitudinal direction at 140° C. ($S^{140}$[MD]) | (%) | 6.4 | 5.7 |
| Shrinkage ratio in width direction at 140° C. ($S^{140}$[TD]) | (%) | 12.8 | 7.6 |
| $S^{140}$[TD] − $S^{140}$[MD] | (%) | 6.4 | 19 |
| Shrinkage ratio in longitudinal direction at 160° C. ($S^{160}$[MD]) | (%) | 19.6 | 18 |
| Shrinkage ratio in width direction at 160° C. ($S^{160}$[TD]) | (%) | 45.5 | 35.7 |
| $S^{160}$[TD] − $S^{160}$[MD] | (%) | 25.9 | 17.7 |
| Shrinkage stress in width direction at 140° C. ($T^{140}$[TD]) | (N/2 mm) | 0.65 | 0.45 |
| Shrinkage stress in width direction at 150° C. ($T^{150}$[TD]) | (N/2 mm) | 0.75 | 0.56 |

Reference Example 3

A shrinkable film B (biaxial stretched film having a thickness of 60 μm and containing polypropylene [trade name "Torayfan BO2570A" manufactured by Toray Industries, Inc.]) was stuck to each of both sides of a polymer film having a thickness of 55 μm and containing a polycarbonate-based resin [trade name "ELMEC" (weight average molecular weight=60,000, average refractive index=1.53, Tg=136° C., Re[590]=1.0 nm, Rth[590]=3.0 nm) manufactured by Kaneka Corporation] through an acrylic pressure-sensitive adhesive layer (having a thickness of 15 μm). After that, the resultant film was stretched with a roll stretching machine at a magnification of 1.26 in an air-circulating oven at 147° C. while the film was held in its longitudinal direction. After the stretching, the above shrinkable film B was peeled together with the above acrylic pressure-sensitive adhesive layer, whereby a retardation film 1-B was produced. Table 2 shows the characteristics of the film. The refractive index ellipsoid of the retardation film 1-B showed the relationship of nx>nz>ny. Table 3 shows the physical properties of the above shrinkable film B.

Production of Negative C Plate

Reference Example 4

A 15 wt % polymer solution was prepared by dissolving, in dichloromethane, a cellulose mixed fatty acid ester in which a part of the hydroxyl groups of cellulose has been substituted by acetyl groups and another part of the hydroxyl groups has been substituted by propionyl groups [trade name "CAP 482-0.5" (degree of acetyl substitution=0.1, degree of propionyl substitution=2.4, average refractive index=1.49) manufactured by Eastman Chemical Company]. The polymer solution was cast on the surface of a glass plate, and the solvent was evaporated by drying the resultant in an air-circulating thermostatic oven at 40±1° C. for 5 minutes and then in an air-circulating thermostatic oven at 100±1° C. for 10 minutes, whereby a film having a thickness of 150 μm was produced. Two films produced as described above were laminated in such a manner that their slow axes were perpendicular to each other, whereby a laminated film 2-A was produced. Table 4 shows the characteristics of the film.

Reference Example 5

17.77 g (40 nmol) of 2,2'-bis(3,4-dicarboxyphenyl) hexafluoropropanoic dianhydride [manufactured by Clariant in Japan] and 12.81 g (40 mmol) of 2,2-bis(trifluoromethyl)-

4,4'-diaminobiphenyl [manufactured by Wakayama Seika Kogyo Co., Ltd.] were added to a reaction vessel (500 mL) mounted with a mechanical stirring device, a Dean and Stark device, a nitrogen-introducing pipe, a thermometer, and a cooling pipe. Subsequently, a solution prepared by dissolving 2.58 g (20 mmol) of isoquinoline in 275.21 g of m-cresol was added to the mixture, and the whole was stirred at 23° C. for 1 hour (at 600 rpm), whereby a uniform solution was obtained. Next, the reaction vessel was heated with an oil bath in such a manner that the temperature in the reaction vessel was 180±3° C., and the solution was stirred for 5 hours while the temperature was kept, whereby a yellow solution was obtained. After the solution had been stirred for additional 3 hours, the heating and the stirring were stopped, and the reaction vessel was left standing to cool to room temperature. As a result, a polymer precipitated in a gel form.

Acetone was added to the yellow solution in the above reaction vessel to dissolve the above gel completely, whereby a dilute solution (7 wt %) was prepared. The dilute solution was gradually added to 2 L of isopropyl alcohol while isopropyl alcohol was continuously stirred, whereby a white powder precipitated. The powder was taken by filtration, and was loaded into 1.5 L of isopropyl alcohol so as to be washed. Further, the same operation was repeated once so that the powder was washed. After that, the powder was taken by filtration again. The powder was dried in an air-circulating thermostatic oven at 60° C. for 48 hours and then at 150° C. for additional 7 hours, whereby a polyimide powder was obtained (85% yield). The polyimide had a weight average molecular weight (Mw) of 124,000 and an imidation ratio of 99.9%.

The above polyimide powder was dissolved in methyl isobutyl ketone, whereby a 15 wt % polyimide solution was prepared. The polyimide solution was applied onto the surface of a polymer film containing triacetylcellulose [trade name "ZRF 80S" (Re[590]=0.5 nm, Rth[590]=1.0 nm) manufactured by FUJIFILM Corporation] in one direction with a rod coater. Next, the solvent was evaporated by drying the resultant in an air-circulating thermostatic oven at 135±1° C. for 5 minutes and then in an air-circulating thermostatic oven at 150±1° C. for 10 minutes, whereby a laminated film 2-B provided with a polyimide layer (having a thickness of 7.5 μm) was produced. Table 4 shows the characteristics of the film.

TABLE 4

|  | Reference Example 4 | Reference Example 5 |
|---|---|---|
| Laminated film | 2-A | 2-B |
| Refractive index ellipsoid | nx = ny > nz | nx = ny > nz |
| Thickness (μm) | 300 | 87.5 |
| Transmittance (%) | 92 | 92 |
| Re[590](nm) | 0.1 | 2.0 |
| Rth[590](nm) | 300 | 300 |
| R40[480]/R40[590] | 0.91 | 1.06 |
| C[550] × $10^{-12}$($m^2$/N) | 9.8 | 11.0 |

Reference Example 6

Production of Liquid Crystal Cell

A liquid crystal panel was taken out of a liquid crystal display apparatus including a liquid crystal cell according to a VA mode [32V type TH-32LX10 manufactured by Matsushita Electric Industrial Co., Ltd.]. All optical films placed above and below the liquid crystal cell were removed, and the surfaces of the front and rear glass substrates of the liquid crystal cell were washed. The liquid crystal cell had Rth[590] in the absence of an electric field of −300 nm and a ratio R40[480]/R40[590] of 1.06.

Example 1

The retardation film 1-A obtained in Reference Example 2 as a biaxial optical element was stuck to the surface on the viewer side of the liquid crystal cell obtained in Reference Example 6 through an acrylic pressure-sensitive adhesive layer in such a manner that the longitudinal direction of the above liquid crystal cell and the direction of the slow axis of the above retardation film 1-A were substantially parallel to each other. Subsequently, the polarizing plate P1 obtained in Reference Example 1 as a first polarizer was stuck to the surface of the above retardation film 1-A through an acrylic pressure-sensitive adhesive layer in such a manner that the longitudinal direction of the above liquid crystal cell and the direction of the absorption axis of the above polarizing plate P1 were substantially parallel to each other. At that time, the direction of the slow axis of the retardation film 1-A and the direction of the absorption axis of the polarizing plate P1 were substantially parallel to each other.

Next, the retardation film 2-A obtained in Reference Example 4 as a negative C plate was stuck to the surface on the backlight side of the above liquid crystal cell through an acrylic pressure-sensitive adhesive layer in such a manner that the longitudinal direction of the above liquid crystal cell and the direction of the slow axis of the above retardation film 2-A were substantially perpendicular to each other. Subsequently, the polarizing plate P2 obtained in Reference Example 1 as a second polarizer was stuck to the surface of the above retardation film 2-A through an acrylic pressure-sensitive adhesive layer in such a manner that the longitudinal direction of the above liquid crystal cell and the direction of the absorption axis of the above polarizing plate P2 were substantially perpendicular to each other. At that time, the direction of the absorption axis of the polarizing plate P1 and the direction of the absorption axis of the polarizing plate P2 were substantially perpendicular to each other.

A liquid crystal panel A thus produced was coupled with the backlight unit of the liquid crystal display apparatus [32V type TH-32LX10 manufactured by Matsushita Electric Industrial Co., Ltd.], whereby a liquid crystal display apparatus A was produced. The backlight unit was turned on. 30 minutes after that, a contrast ratio between a front direction and an oblique direction of the liquid crystal display apparatus A was measured. Table 5 shows the results.

Example 2

A liquid crystal panel B and a liquid crystal display apparatus B were each produced in the same manner as in Example 1 except that the retardation film 1-B obtained in Reference Example 3 was used as a biaxial optical element. The backlight unit of the apparatus was turned on. 30 minutes after that, a contrast ratio between a front direction and an oblique direction of the liquid crystal display apparatus B was measured. Table 5 shows the results.

Comparative Example 1

A liquid crystal panel X and a liquid crystal display apparatus X were each produced in the same manner as in Example 1 except that the retardation film 1-A used as a biaxial optical element was placed in such a manner that the direction of its slow axis and the direction of the absorption axis of the polarizing plate P1 were substantially perpendicular to each other. The backlight unit of the apparatus was turned on. 30 minutes after that, a contrast ratio between a front direction and an oblique direction of the liquid crystal display apparatus X was measured. Table 5 shows the results.

Comparative Example 2

A liquid crystal panel Y and a liquid crystal display apparatus Y were each produced in the same manner as in Example 1 except that the laminated film 2-B obtained in Reference Example 5 was used as a negative C plate. The backlight unit of the apparatus was turned on. 30 minutes after that, a contrast ratio between a front direction and an oblique direction of the liquid crystal display apparatus Y was measured. Table 5 shows the results.

TABLE 5

|  | Biaxial optical element | | | | Negative C plate | | | liquid crystal display apparatus | | | |
| --- | --- | --- | --- | --- | --- | --- | --- | --- | --- | --- | --- |
|  |  | Wavelength | | |  | Wavelength | | | | Contrast ratio (at a polar angle of 40°) | | |
|  | Retardation film | dispersion value ($D_1$) | Re [590] (nm) | Placement* | Retardation film | dispersion value ($D_2$) | Rth [590] (nm) | Liquid crystal panel | Average | Minimum value | Maximum value – minimum value |
| Example 1 | 1-A | 1.01 | 270 | Parallel | 2-A | 0.91 | 300 | A | 186.6 | 158.0 | 67.1 |
| Example 2 | 1-B | 1.07 | 270 | Parallel | 2-A | 0.91 | 300 | B | 165.9 | 143.2 | 54.4 |
| Comparative Example 1 | 1-A | 1.01 | 270 | Perpendicular | 2-A | 0.91 | 300 | X | 112.0 | 71.1 | 126.6 |
| Comparative Example 2 | 1-A | 1.01 | 270 | Parallel | 2-B | 1.06 | 300 | Y | 87.8 | 42.3 | 155.3 |

*Showing a relationship between the direction of the slow axis of a biaxial optical element and the direction of the absorption axis of a first polarizer

[Evaluation]

Figure 7:
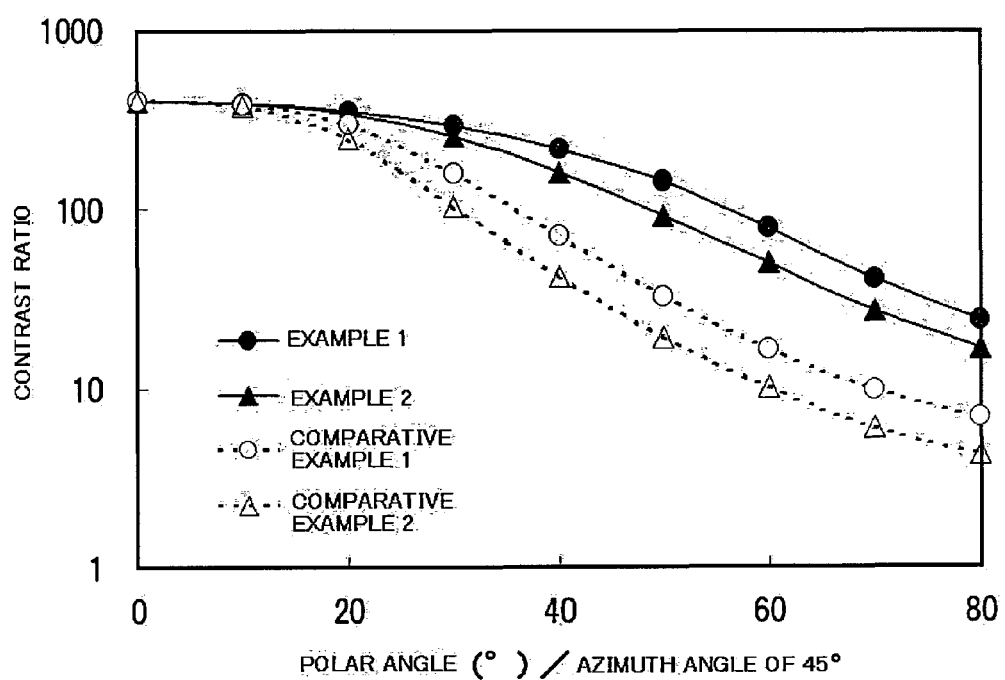
FIG. 7 Graph showing contrast ratios of liquid crystal display apparatuses of Examples and Comparative Examples at an azimuth angle of 45° and polar angles of 0° (in a front direction) to 80°.
Figure 8:
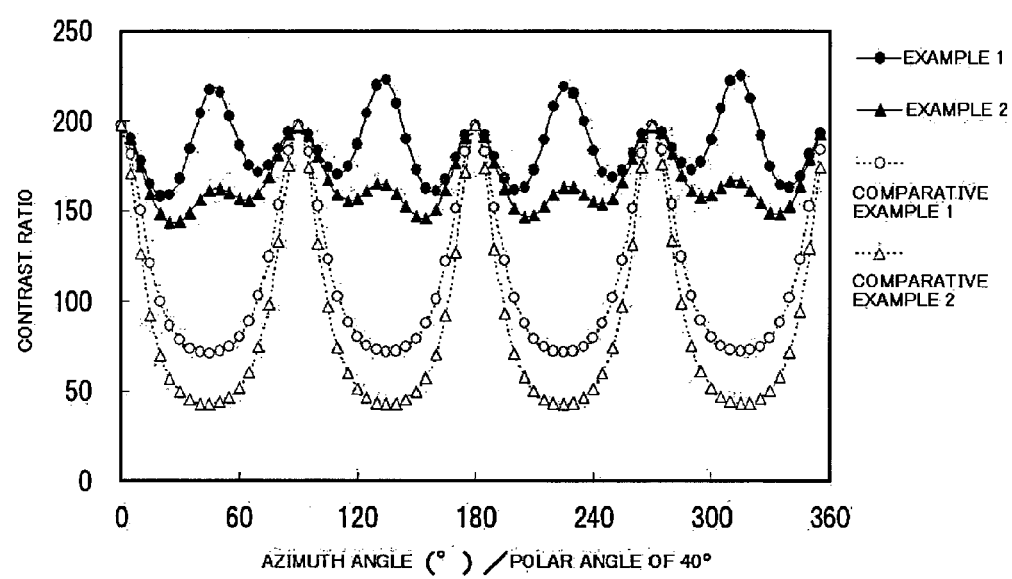
FIG. 8 Graph showing contrast ratios of liquid crystal display apparatuses of Examples and Comparative Examples at a polar angle of 40° and azimuth angles of 0° (in a longitudinal direction) to 360°.

FIG. 7 is a graph showing the contrast ratios of each of the liquid crystal display apparatuses of the examples and the comparative examples at an azimuth angle of 45° and polar angles of 0° (front direction) to 80°. FIG. 8 is a graph showing the contrast ratios of each of the liquid crystal display apparatuses of the examples and the comparative examples at a polar angle of 40° and azimuth angles of 0° (longitudinal direction) to 360°. As shown in FIGS. 7 and 8, each of the liquid crystal display apparatuses of Examples 1 and 2 had the following characteristics: a contrast ratio between a front direction and an oblique direction was maintained at a high level, and, in the case where one viewed the screen of each of the apparatuses in an oblique direction, the contrast ratio was constant even when he or she viewed the screen in any azimuth of 0° to 360°. On the other hand, each of the liquid crystal display apparatuses of Comparative Examples 1 and 2 had the following characteristics: a contrast ratio between a front direction and an oblique direction reduced, and, in the case where one viewed the screen of each of the apparatuses in an oblique direction, the contrast ratio remarkably reduced in a specific azimuth.

INDUSTRIAL APPLICABILITY

As described above, the liquid crystal panel of the present invention is extremely useful in improving the display characteristic of a liquid crystal display apparatus because the panel can increase the contrast ratio in an oblique direction of the apparatus. The liquid crystal display apparatus including the liquid crystal panel of the present invention is suitably used in a liquid crystal television.

The invention claimed is:

1. A liquid crystal panel, comprising:
   a liquid crystal cell;
   a first polarizer placed on one side of the liquid crystal cell;
   a second polarizer placed on another side of the liquid crystal cell;
   a biaxial optical element placed between the liquid crystal cell and the first polarizer; and
   a negative C plate placed between the second polarizer and the biaxial optical element, wherein:
   a direction of an absorption axis of the first polarizer is substantially perpendicular to a direction of an absorption axis of the second polarizer;
   a refractive index ellipsoid of the biaxial optical element has a relationship of nx>nz>ny and a direction of a slow axis of the biaxial optical element is substantially parallel to the direction of the absorption axis of the first polarizer;
   a refractive index ellipsoid of the negative C plate has a relationship of nx=ny>nz; and
   a wavelength dispersion value ($D_1$) of the biaxial optical element and a wavelength dispersion value ($D_2$) of the negative C plate satisfy a relationship of $D_1 \geq D_2$, wherein
   said liquid crystal panel comprises only one biaxial optical element,
   said nz coefficient of said biaxial optical element is 0.3 to 0.6, and
   the liquid crystal cell includes a liquid crystal layer containing liquid crystal molecules aligned in a homeotropic alignment in the absence of an electric field.

2. A liquid crystal panel according to claim 1, wherein a difference ($D_1-D_2$) between the wavelength dispersion value ($D_1$) of the biaxial optical element and the wavelength dispersion value ($D_2$) of the negative C plate is 0 to 0.2.

3. A liquid crystal panel according to claim 1, wherein the wavelength dispersion value ($D_1$) of the biaxial optical element, the wavelength dispersion value ($D_2$) of the negative C plate, and a wavelength dispersion value ($D_{LC}$) of the liquid crystal cell satisfy a relationship of $D_{LC}>D_1 \geq D_2$ or of $D_1 \geq D_{LC}>D_2$.

4. A liquid crystal panel according to claim 1, wherein the negative C plate is placed between the liquid crystal cell and the second polarizer.

5. A liquid crystal panel according to claim 1, wherein the negative C plate is placed between the liquid crystal cell and the biaxial optical element.

6. A liquid crystal panel according to claim 1, wherein $Rth[590]_{LC}$ of the liquid crystal cell in the absence of an electric field is 200 nm to 500 nm.

7. A liquid crystal panel according to any claim 1, wherein Re[590] of the biaxial optical element is 100 nm to 300 nm.

8. A liquid crystal panel according to claim 1, wherein the wavelength dispersion value ($D_1$) of the biaxial optical element is 0.90 to 1.10.

9. A liquid crystal panel according to claim 1, wherein an Nz coefficient of the biaxial optical element is 0.1 to 0.7.

10. A liquid crystal panel according to claim 1, wherein the biaxial optical element includes a retardation film containing a norbornene-based resin.

11. A liquid crystal panel according to claim 1, wherein an absolute value for a sum of $Rth[590]_2$ of the negative C plate and $Rth[590]_{LC}$ of the liquid crystal cell in the absence of an electric field ($|Rth[590]_2+Rth[590]_{LC}|$) is 50 nm or less.

12. A liquid crystal panel according to claim 1, wherein $Rth[590]_2$ of the negative C plate is 150 nm to 550 nm.

13. A liquid crystal panel according to claim 1, wherein the wavelength dispersion value ($D_2$) of the negative C plate is 0.70 to 1.10.

14. A liquid crystal panel according to claim 1, wherein the negative C plate includes a retardation film containing a cellulose-based resin.

15. A liquid crystal display apparatus comprising the liquid crystal panel according to claim 1.

16. A liquid crystal display apparatus according to claim 15, wherein an average of contrast ratios at an azimuth angle of 45° and polar angles of 0° to 80° is 160 or more.

17. A liquid crystal display apparatus according to claim 15, wherein an average of contrast ratios at a polar angle of 40° and azimuth angles of 0° to 360° is 120 or more.

18. A liquid crystal display apparatus according to claim 15, wherein a difference between a maximum value and a minimum value for contrast ratios at a polar angle of 40° and azimuth angles of 0° to 360° is 100 or less.

19. A liquid crystal display apparatus according to claim 15, wherein the liquid crystal display apparatus is used in a television.

* * * * *